US012487166B2

(12) United States Patent
Lebel et al.

(10) Patent No.: US 12,487,166 B2
(45) Date of Patent: Dec. 2, 2025

(54) METHOD FOR LABEL-FREE IMAGING AND CLASSIFICATION OF MALARIA PARASITES

(71) Applicants: CZ Biohub SF, LLC, San Francisco, CA (US); The Regents of the University of California, Oakland, CA (US)

(72) Inventors: Paul Lebel, San Francisco, CA (US); Rafael Gomez-Sjoberg, San Francisco, CA (US); Joseph L. DeRisi, San Francisco, CA (US); Jenny Folkesson, San Francisco, CA (US)

(73) Assignees: CZ Biohub SF, LLC, San Francisco, CA (US); The Regents of the University of California, Oakland, CA (US)

( * ) Notice: Subject to any disclaimer, the term of this patent is extended or adjusted under 35 U.S.C. 154(b) by 400 days.

(21) Appl. No.: 18/169,104

(22) Filed: Feb. 14, 2023

(65) Prior Publication Data

US 2023/0194407 A1 Jun. 22, 2023

Related U.S. Application Data

(63) Continuation of application No. PCT/US2021/047974, filed on Aug. 27, 2021.
(Continued)

(51) Int. Cl.
*G01N 15/1429* (2024.01)
*G01N 15/14* (2006.01)
(Continued)

(52) U.S. Cl.
CPC ..... *G01N 15/1429* (2013.01); *G01N 15/1433* (2024.01); *G01N 15/147* (2013.01);
(Continued)

(58) Field of Classification Search
USPC .......................................................... 382/134
See application file for complete search history.

(56) References Cited

U.S. PATENT DOCUMENTS

| 2017/0045495 A1 | 2/2017 | Trowell et al. |
| 2020/0181680 A1* | 6/2020 | Pollak ...................... C12Q 1/68 |
| 2020/0264557 A1* | 8/2020 | Hayden .............. G01N 15/1484 |

FOREIGN PATENT DOCUMENTS

EP 3462170 A1 * 4/2019 ......... G01N 15/1434

OTHER PUBLICATIONS

International Application No. PCT/US2021/047974, International Preliminary Report on Patentability mailed on Mar. 9, 2023, 9 pages.
(Continued)

*Primary Examiner* — Jacky X Zheng
(74) *Attorney, Agent, or Firm* — Kilpatrick Townsend & Stockton LLP

(57) ABSTRACT

A method of measuring malarial parasitemia includes disposing a sample including red blood cells in liquid form on a sample stage, illuminating the sample with optical radiation, capturing a plurality of images of the sample, and extracting, from the one or more of the plurality of images, a set of red blood cell images. Each red blood cell image is associated with a particular red blood cell. The method also includes for each red blood cell image in the set of red blood cell images, inputting each red blood cell image into a machine learning model and generating, using the machine learning model, a classification related to a malaria parasite lifecycle stage for each of the red blood cells. The method further includes determining the malarial parasitemia for the sample.

19 Claims, 25 Drawing Sheets

Related U.S. Application Data

(60) Provisional application No. 63/072,037, filed on Aug. 28, 2020.

(51) Int. Cl.
*G01N 15/1433* (2024.01)
*G06T 7/00* (2017.01)
*G06T 7/11* (2017.01)
*G01N 15/01* (2024.01)

(52) U.S. Cl.
CPC .............. *G06T 7/0012* (2013.01); *G06T 7/11* (2017.01); *G01N 2015/012* (2024.01); *G01N 2015/1486* (2013.01); *G06T 2207/10056* (2013.01); *G06T 2207/20084* (2013.01)

(56) References Cited

OTHER PUBLICATIONS

International Application No. PCT/US2021/047974, International Search Report and Written Opinion mailed on Dec. 2, 2021, 10 pages.

\* cited by examiner

| FIG. 5A | FIG. 5B |

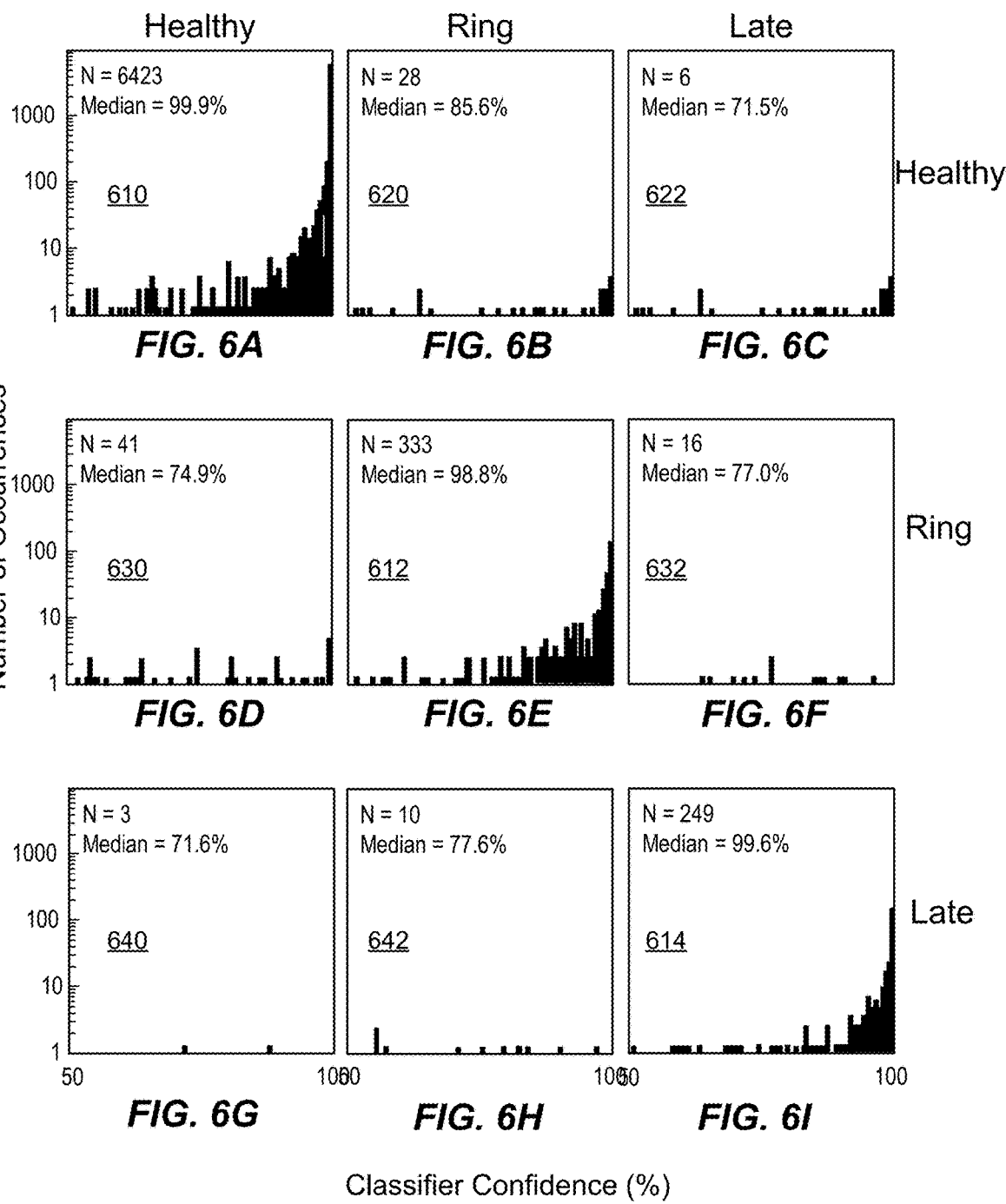

|          | Healthy          | Ring             | Troph            | Schizont         |                   |
|----------|------------------|------------------|------------------|------------------|-------------------|
| Healthy  | 6451<br>90.60% | 11<br>0.15%  | 2<br>0.03%   | 0<br>0.0%    | 99.8%<br>(0.2%)   |
| Ring     | 15<br>0.21%  | 361<br>5.07% | 2<br>0.03%   | 0<br>0.0%    | 95.50%<br>(14.6%) |
| Troph    | 3<br>0.04%   | 5<br>0.07%   | 168<br>2.36% | 5<br>0.07%   | 92.82%<br>(7.18%) |
| Schizont | 0<br>0.0%    | 0<br>0.0%    | 11<br>0.15%  | 85<br>1.2%   | 88.54%<br>(21.7%) |
|          | 99.71%<br>(0.29%)| 95.75%<br>(4.24%)| 91.80%<br>(8.20%)| 94.44%<br>(5.56%)| 99.23%<br>(0.77%) |

*FIG. 11*

METHOD FOR LABEL-FREE IMAGING AND CLASSIFICATION OF MALARIA PARASITES

CROSS-REFERENCE TO RELATED APPLICATION

This application is a continuation of International Application No. PCT/US2021/047974, filed Aug. 27, 2021, entitled "Method and System for Label-Free Imaging and Classification of Malaria Parasites," which claims priority to U.S. Provisional Patent Application No. 63/072,037, filed on Aug. 28, 2020, entitled "Method and System for Label-Free Imaging and Classification of Malaria Parasites," the disclosures of which are hereby incorporated by reference in their entirety for all purposes.

BACKGROUND OF THE INVENTION

Malaria parasites are routinely identified by microscopic analysis, in this analysis process, a blood sample is spread out on a microscope slide as a smear and stained, typically using the Giemsa stain. This staining process results in the parasites having a distinctive appearance. The fixed and stained blood smear is then examined under a microscope to detect the presence of the malaria parasites.

Despite the progress made in the identification of malaria parasites, there exists a need in the art for improved methods and systems for performing imaging and classification of malaria parasites.

SUMMARY OF THE INVENTION

Embodiments of the present invention relate generally to methods and systems for microscopic analysis of malaria parasitemia. More particularly, label-free classification of live, parasitized red blood cells is implemented using bright-field microscopy. Embodiments of the present invention provide for quantitative detection and classification of *Plasmodium falciparum* life cycle stages with high classification accuracy and high sample composition accuracy.

Manual microscopic inspection of fixed and stained smears remains the gold standard for quantitative analysis of *Plasmodium*-infected red blood cells, a procedure that has changed little over a century. Unfortunately, the fixation and staining procedures used in microscopy are time consuming and variable. Furthermore, manual parasite counting is labor-intensive, skill-dependent, and statistically-limited by the total number of cells that can reasonably be inspected.

Embodiments of the present invention utilize visible and/or ultraviolet bright-field microscopy combined with deep learning to achieve automated, label-free classification of live, parasitized red blood cells, thereby reducing or eliminating the variable and labor-intensive steps associated with conventional techniques. As described herein, embodiments of the present invention achieve enhanced image contrast and resolution in comparison with conventional techniques and achieve quantitative detection and classification of *Plasmodium falciparum* life cycle stages with an overall accuracy of 98.6% or greater, and parasitemia measurement accuracy of 99.5% or greater. The methods and systems described herein are useful over a large parasitemia range, providing for detection of parasitemia at lower parasitemia levels than available by manual scoring of Giemsa-stained smears, which is typically limited by the total number of cells that a technician can count without fatiguing.

According to an embodiment of the present invention, a method of measuring malarial parasitemia is provided. The method includes receiving an image of a sample including a plurality of red blood cells immersed in liquid and inputting the image of the sample into a machine learning model. The method also includes generating, using the machine learning model, a classification related to a malaria parasite lifecycle stage for each of the plurality of red blood cells and determining the malarial parasitemia for the sample. The sample can be free of staining, including Giemsa staining. The image of the sample can be a bright-field image. Receiving the image can include disposing the sample on a sample stage, illuminating the sample with optical radiation, and capturing the image of the sample. The image of the sample can include one of a plurality of images of the sample. Each of the plurality of images can be associated with a different focal plane. The sample can be purified to remove white blood cells and platelets to provide a plurality of purified red blood cells suspended in cell culture medium. The sample can be whole blood. The classification related to the malaria parasite lifecycle stage can include a suite of confidence scores, wherein each of the confidence scores in the suite of confidence scores defines a probability that a particular red blood cell is associated with one of a plurality of malaria parasite lifecycle stages. Generating, using the machine learning model, a classification related to a malaria parasite lifecycle stage for each of the plurality of red blood cells can include extracting, from the image, a set of red blood cell images, wherein each red blood cell image is associated with a particular red blood cell. The method can also include, prior to extracting the set of red blood cell images, performing semantic segmentation on the image.

According to another embodiment of the present invention, a method of measuring malarial parasitemia is provided. The method includes disposing a sample including red blood cells in liquid form on a sample stage, illuminating the sample with optical radiation, and capturing a plurality of images of the sample. The method also includes extracting, from the one or more of the plurality of images, a set of red blood cell images. Each red blood cell image is associated with a particular red blood cell. For each red blood cell image in the set of red blood cell images, the method includes inputting each red blood cell image into a machine learning model and generating, using the machine learning model, a classification related to a malaria parasite lifecycle stage for each of the plurality of red blood cells. The classification can be implemented as a suite of confidence scores. Each of the confidence scores in the suite of confidence scores defines a probability that the particular red blood cell is associated with one of the plurality of malaria parasite lifecycle stages. The method further includes determining the malarial parasitemia for the sample. The method can include, prior to determining the malarial parasitemia for the sample, determining that a highest confidence score in a particular suite of confidence scores is less than a threshold and discarding that particular suite of confidence scores.

According to a specific embodiment of the present invention, a method of measuring malarial parasitemia is provided. The method includes receiving a first set of red blood cell images and receiving a second set of red blood cell images. Each red blood cell image in the first set of red blood cell images and each red blood cell image in the second set of red blood cell images is associated with a particular red blood cell. The method also includes computing a first focus metric for each red blood cell image in the first set of red blood cell images and computing a second focus metric for each red blood cell image in the second set of red blood cell images. The method further includes selecting, from each red blood cell image in the first set of red blood cell images and each red blood cell image in the second set of red blood cell images, the red blood cell image with the greater focus metric to form an input set of red blood cell images. For each red blood cell image in the input set of red blood cell images, the method includes inputting each red blood cell image into a machine learning model and generating, using the machine learning model, a suite of confidence scores. Each of the confidence scores in the suite of confidence scores defines a probability that the particular red blood cell is associated with one of a plurality of malaria parasite lifecycle stages. The method further includes determining the malarial parasitemia for the particular red blood cells.

Receiving a first set of red blood cell images and a second set of red blood cell images can include disposing a sample including red blood cells on a sample stage, illuminating the sample with optical radiation, capturing a first image of the sample at a first focal plane, performing semantic segmentation on the first image, extracting, from the first image, the first set of red blood cell images, capturing a second image of the sample at a second focal plane, performing semantic segmentation on the second image, and extracting, from the second image, the second set of red blood cell images. The sample stage can include a flow cell. The sample can include live cells. The sample can be free of staining, for example, Giemsa staining. The optical radiation can include light having a wavelength between 350 nm and 420 nm. The suite of confidence scores can include a first confidence score associated with a malaria-free red blood cell, a second confidence score associated with a ring-stage parasite, a third confidence score associated with a trophozoite-stage parasite, and a fourth confidence score associated with a schizont-stage parasite. The malarial parasitemia can be categorized as an early stage parasitemia associated with a ring-stage parasite or a late-stage parasitemia associated with a trophozoite-stage or a schizont-stage parasite.

According to another specific embodiment of the present invention, a method of measuring malarial parasitemia in a sample including red blood cells is provided. The method includes receiving a first set of red blood cell images. Each red blood cell image in the first set of red blood cell images is associated with a particular red blood cell. For each red blood cell image in the first set of red blood cell images, the method includes inputting each red blood cell image into a machine learning model and generating, using the machine learning model, a first suite of confidence scores. Each of the confidence scores in the first suite of confidence scores defines a probability that the particular red blood cell is associated with one of a plurality of malaria parasite lifecycle stages. The method also includes receiving a second set of red blood cell images. Each red blood cell image in the second set of red blood cell images is associated with the particular red blood cell. For each red blood cell image in the second set of red blood cell images, the method includes inputting each red blood cell image into the machine learning model and generating, using the machine learning model, a second suite of confidence scores. Each of the confidence scores in the second suite of confidence scores defines a probability that the particular red blood cell is associated with one of the plurality of malaria parasite lifecycle stages. The method further includes forming an updated suite of confidence scores by selecting, from the first suite of confidence scores and the second suite of confidence scores, a highest confidence score associated with each particular red blood cell and determining the malarial parasitemia for the sample using the updated suite of confidence scores.

The first set of red blood cell images can be associated with a first focal plane and the second set of red blood cell images can be associated with a second focal plane. Receiving a first set of red blood cell images and a second set of red blood cell images can include disposing the sample including red blood cells on a sample stage, illuminating the sample with optical radiation, capturing a first image of the sample at a first focal plane, extracting, from the first image, the first set of red blood cell images, capturing a second image of the sample at a second focal plane, and extracting, from the second image, the second set of red blood cell images. The sample stage can include a flow cell and/or live cells. The optical radiation can include light having a wavelength between 350 nm and 420 nm. The can be free of staining, for example, Giemsa staining. The updated suite of confidence scores can include a first confidence score associated with a malaria-free red blood cell, a second confidence score associated with a ring-stage parasite, a third confidence score associated with a trophozoite-stage parasite, and a fourth confidence score associated with a schizont-stage parasite.

According to a particular embodiment of the present invention, a method of measuring malarial parasitemia is provided. The method includes receiving a set of red blood cell images. Each red blood cell image in the set of red blood cell images is associated with a particular red blood cell. For each red blood cell image in the set of red blood cell images, the method includes inputting each red blood cell image into a machine learning model and generating, using the machine learning model, a suite of confidence scores. Each of the confidence scores in the suite of confidence scores defines a probability that the particular red blood cell is associated with one of a plurality of malaria parasite lifecycle stages. The method also includes exporting a subset of red blood cell images having a highest confidence score in the suite of confidence scores less than a threshold, displaying each of the subset of red blood cell images, receiving at least one updated confidence score for each of the subset of red blood cell images, updating the suite of confidence scores for each of the subset of red blood cell images using the at least one updated confidence score, and determining the malarial parasitemia for the particular red blood cells.

Receiving the set of red blood cell images can include flowing a sample through a flow cell and capturing the set of red blood cell images. The sample can include live cells and/or a liquid. The sample can be free of staining, for example, Giemsa staining. The suite of confidence scores can include a first confidence score associated with a malaria-free red blood cell, a second confidence score associated with a ring-stage parasite, a third confidence score associated with a trophozoite-stage parasite, and a fourth confidence score associated with a schizont-stage parasite. The malarial parasitemia can be categorized as an early stage parasitemia associated with a ring-stage parasite or a late-stage parasitemia associated with a trophozoite-stage or a schizont-stage parasite. Each image of the set of red blood cell images can be associated with a different focal plane.

According to another embodiment of the present invention, a microscope is provided. The microscope includes a light source, a flow cell operable to receive and transport a sample including a plurality of red blood cells, illumination optics coupled to the light source and operable to illuminate the sample, and a detector operable to receive light transmitted through the sample. The microscope also includes one or more processors in communication with the light source and the detector. The one or more processors are configured to perform operations that include receiving an image of the sample and inputting the image of the sample into a machine learning model. The one or more processors are also configured to perform operations that include generating, using the machine learning model, a classification related to a malaria parasite lifecycle stage for each of the plurality of red blood cells and determining the malarial parasitemia for the sample. The operations can further include acquiring a plurality of images of a red blood cell. The plurality of images can include differing views of the red blood cell as a result of their motion under flow. The differing views can be associated with different focal planes.

Numerous benefits are achieved by way of the present disclosure over conventional techniques. For example, embodiments of the present invention can provide methods and system for the detection and classification of live, malaria-infected red blood cells without the use of fixation or staining procedures. Because embodiments of the present invention utilize bright-field microscopy and do not utilize special reagents or highly trained technicians, detection and classification of malaria can be performed more rapidly and at lower reagent and labor cost than the conventional techniques. Embodiments of the present invention have wide applicability, including in research laboratories that study malaria and culture the parasite in vitro, as well as in health facilities that screen/diagnose patients for malaria infection. Using embodiments of the present invention, low cost, field-deployable devices are provided that can examine the blood of malaria-infected patients, resulting in a significant impact in resource-poor regions of the world where malaria is endemic.

Since embodiments are label-free, i.e., do not utilize fixation and staining processes, reductions in technician time on the order of 30-45 minutes are saved for each analysis process. Moreover, embodiments remove the steps of the conventional technique that introduce the most variability in results, while reducing technician labor load and technician training requirements. By screening a larger number of cells per sample, the methods and systems described herein increase the statistical resolving power, providing unique insight for cases with low parasitemia. Additionally, embodiments can utilize samples in liquid phase that can flow through the microscope during operation, increasing throughput and reducing optical system complexity. Although some embodiments of the present invention are discussed in relation detecting malaria parasitemia, the detection and/or classification of other blood-borne parasites including intra-cellular parasites are included within the scope of the present invention. These and other embodiments of the disclosure, along with many of its advantages and features, are described in more detail in conjunction with the text below and corresponding figures.

BRIEF DESCRIPTION OF THE DRAWINGS

FIG. 6A is a histogram of classifier confidence for healthy red blood cells classified as healthy according to an embodiment of the present invention.

FIG. 6B is a histogram of classifier confidence for red blood cells having ring-stage malaria parasites classified as healthy according to an embodiment of the present invention.

FIG. 6C is a histogram of classifier confidence for red blood cells having late-stage malaria parasites classified as healthy according to an embodiment of the present invention.

FIG. 6D is a histogram of classifier confidence for healthy red blood cells classified as having ring-stage malaria parasites according to an embodiment of the present invention.

FIG. 6E is a histogram of classifier confidence for red blood cells having ring-stage malaria parasites classified as having ring-stage malaria parasites according to an embodiment of the present invention.

FIG. 6F is a histogram of classifier confidence for red blood cells having late-stage malaria parasites classified as having ring-stage malaria parasites according to an embodiment of the present invention.

FIG. 6G is a histogram of classifier confidence for healthy red blood cells classified as having late-stage malaria parasites according to an embodiment of the present invention.

FIG. 6H is a histogram of classifier confidence for red blood cells having ring-stage malaria parasites classified as having late-stage malaria parasites according to an embodiment of the present invention.

FIG. 6I is a histogram of classifier confidence for red blood cells having late-stage malaria parasites classified as having late-stage malaria parasites according to an embodiment of the present invention.

FIG. 11 is a confusion matrix corresponding to the R-CNN system illustrated in FIG. 10A.

DETAILED DESCRIPTION OF SPECIFIC EMBODIMENTS

Embodiments of the present invention relate generally to methods and systems for microscopic analysis of malaria parasitemia. More particularly, label-free classification of live, parasitized red blood cells is implemented using brightfield microscopy. Embodiments of the present invention provide for quantitative detection and classification of *Plasmodium falciparum* life cycle stages with high classification accuracy and high sample composition accuracy.

The inventors have determined that the absence of labelfree parasite classification by microscopy may be a result of the weak interaction of visible light with biological matter (insufficient contrast), especially for sub-micron morphological features (insufficient resolution). Accordingly, embodiments of the present invention utilize systems that provide high resolution and contrast by using predetermined wavelengths to yield more clearly-resolved parasite physiology as compared with visible light, enabling human annotation to serve as ground truth labels for training machine learning systems to distinguish four separate categories of red blood cells: healthy, ring-stage, trophozoite-stage, and schizont-stage. The embodiments describe herein also utilize the fact that hemoglobin (Hb) optical absorption influences the qualitative nature of the images and that classification performance is a function of both resolution, which improves with decreasing wavelength, and contrast, which improves with higher Hb absorbance. As a result, embodiments of the present invention are able to achieve an overall parasitemia binary classification accuracy of 99.5% or greater, and a full breakdown of lifecycle stages at 98.6% accuracy or greater, which is classification performance exceeding that provided by manual parasite counting by the standard Giemsa staining method.

Figure 1A:
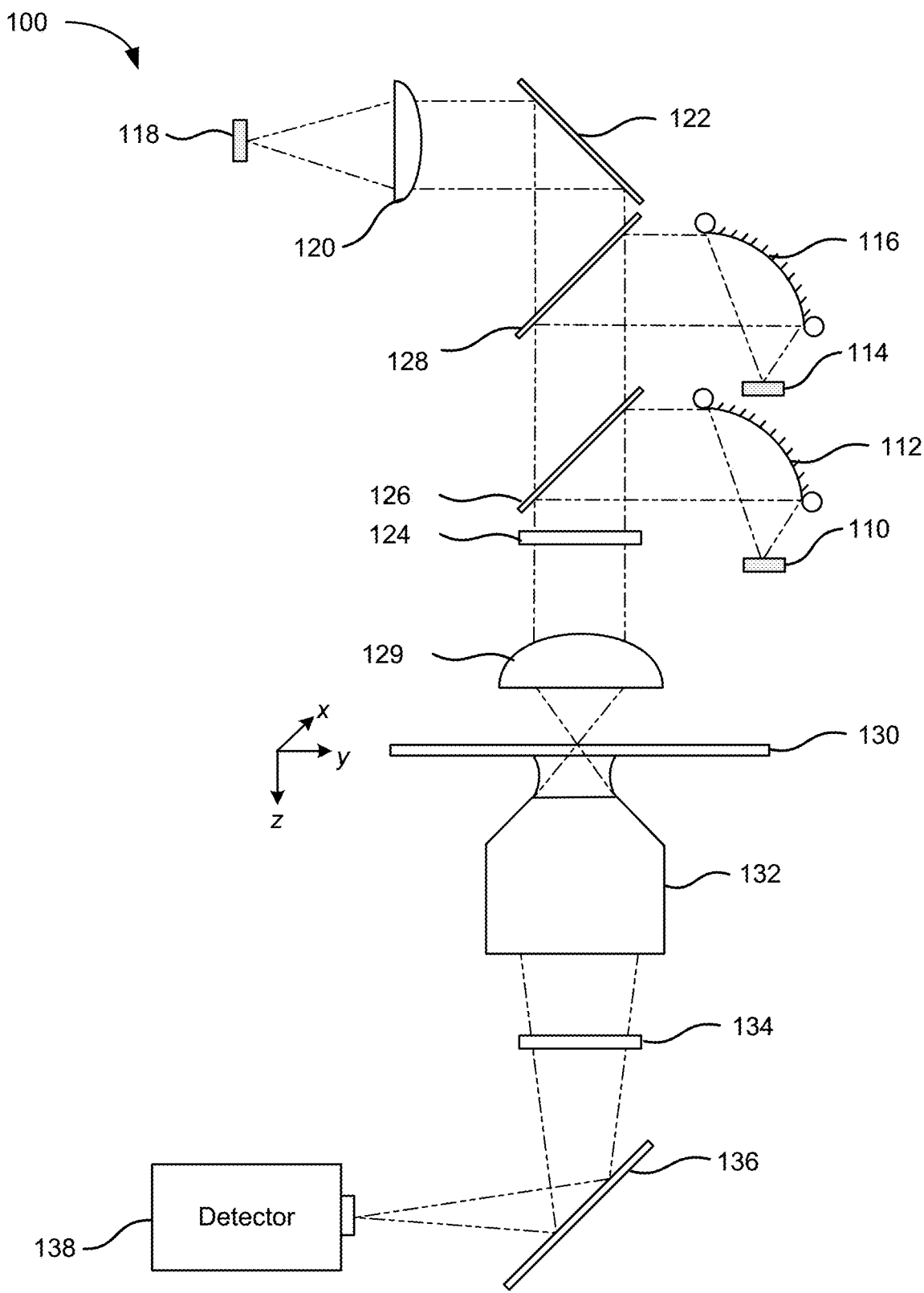
FIG. 1A is a simplified schematic diagram illustrating a multi-wavelength microscope with an integrated flow cell according to an embodiment of the present invention.

FIG. 1A is a simplified schematic diagram illustrating a multi-wavelength microscope with an integrated flow cell according to an embodiment of the present invention. The multi-wavelength microscope illustrated in FIG. 1A operates in a transmitted light, bright-field configuration using finite conjugate objective lens 132 to form an image on a detector 138, which may be implemented using a variety of commercially available cameras. A rigid fold mirror 136 is utilized without the utilization of a specialized tube lens.

Illumination light is provided by one of three collimated light emitting diodes (LEDs) operating at three wavelengths. As illustrated in FIG. 1A, light emitted by first LED 110 (e.g., an ultraviolet LED emitting at 285 nm) is collimated by parabolic mirror 112 and reflected into an illumination path using dichroic mirror 126. Light emitted by second LED 114 (e.g., an ultraviolet LED emitting at 365 nm) is collimated by parabolic mirror 116 and reflected into the illumination path using dichroic mirror 128. Additionally, light emitted by third LED 110 (e.g., a visible LED (e.g., an M565F3 Fiber-Coupled LED available from Thorlabs of Newton, NJ) emitting over a wavelength range from ~500 nm to ~650 nm) is collimated by lens 120 and reflected into the illumination path by mirror 122.

Condenser lens 129 receives illumination light after it has passed through optional filter wheel 124, which is utilized in fluorescence applications. Samples are mounted in Quartz Flow Cell (QFC) 130 for compatibility with deep UV imaging due to the use of first LED 110 (i.e. operating at 285 nm) and second LED 114 (i.e., operating at 365 nm). In other embodiments that do not utilize UV light, other flow cell designs can be utilized that are fabricated from other materials. An optional spectral filter 134, which may be implemented as a filter wheel, is utilized in some embodiments. Utilizing a flow cell, embodiments of the present invention enable imaging of live cells in liquid form at high throughput and with accurate control over the cell placement with respect to the imaging path. Thus, in contrast to a fixed and stained smear, imaging in a flow through modality enables the use of an optical microscope with reduced requirements, including motion control hardware, which would be utilized in a conventional microscope, to image a large number of cells.

In operation, cultured red blood cells infected with *Plasmodium falciparum* were injected into QFC 130 and imaged using multi-wavelength microscope 100 (100×/0.85 glycerol immersion quartz objective lens 132) using a brightfield modality. In some implementations, limitations were placed on imaging times (e.g., less than 2-3 hours) to avoid parasite health decline outside of incubation conditions. Additionally, ultraviolet light exposure was controlled by using a hardware synchronization module that only illuminated the sample the duration of the camera exposure. This system enables imaging of freshly-prepared live cells using QFC 130 on multiple distinct dates at various parasitemia levels, with the results being able to be later merged computationally for aggregate analysis.

Figure 1B:
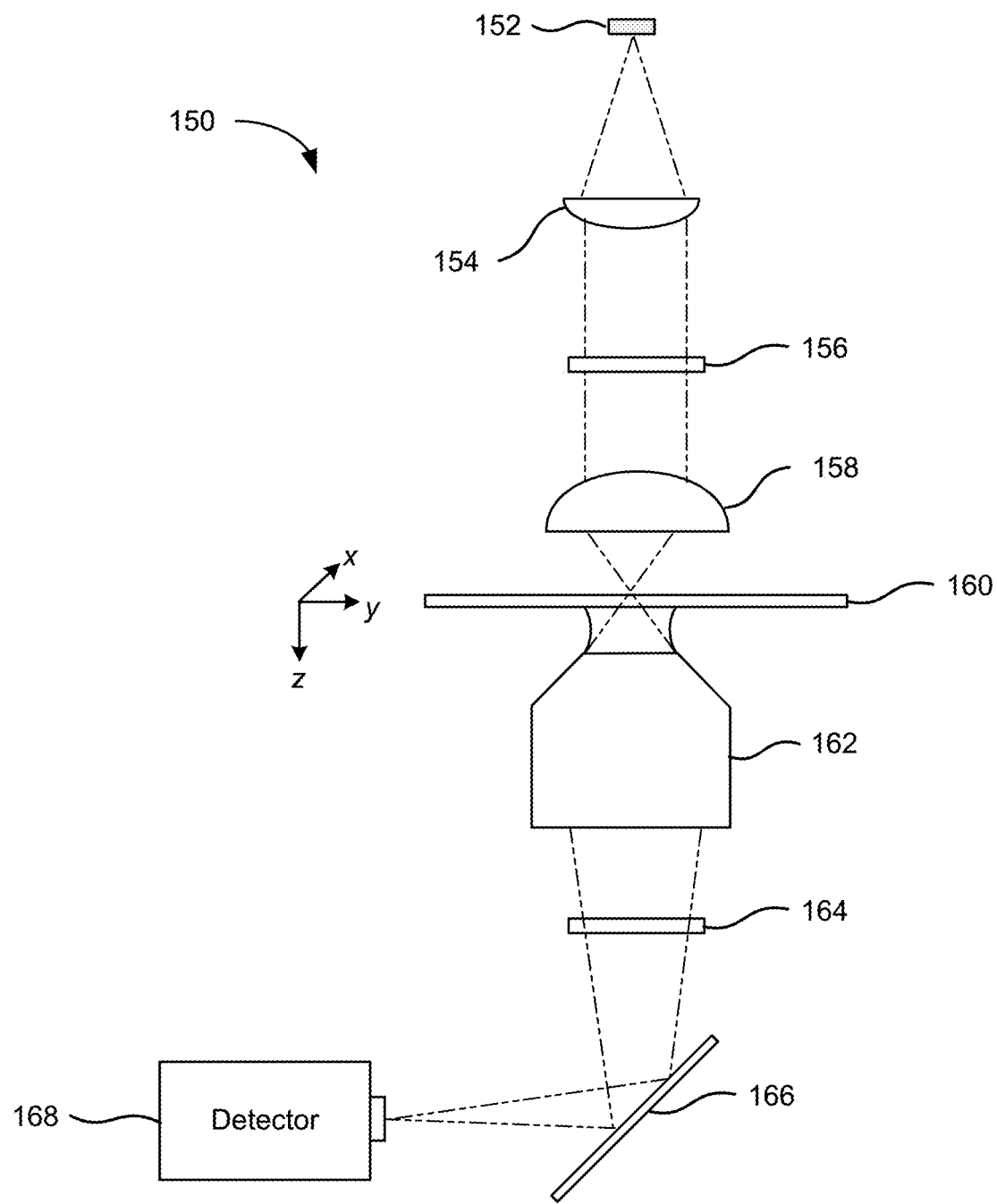
FIG. 1B is a simplified schematic diagram illustrating a single wavelength microscope with an integrated flow cell according to an embodiment of the present invention.

FIG. 1B is a simplified schematic diagram illustrating a single wavelength microscope with an integrated flow cell according to an embodiment of the present invention. The single wavelength microscope illustrated in FIG. 1B shares some common elements with those utilized in FIG. 1A and the description provided in relation to FIG. 1A is applicable to FIG. 1B as appropriate.

In FIG. 1B, a single wavelength microscope 150 is illustrated that operates in a transmitted light, bright-field configuration using finite conjugate objective lens 162 to form an image on detector 168, which may be implemented using a variety of commercially available cameras. A rigid fold mirror 166 is utilized without the utilization of a specialized tube lens.

Illumination light is provided by a collimated LED operating at 405 nm. As illustrated in FIG. 1B, light emitted by LED 152 (e.g., a violet LED emitting at 405 nm) is collimated by lens 154 and propagates into the illumination path. Condenser lens 158 receives illumination light after it has passed through optional spectral filter 156, which is utilized in fluorescence applications. Samples are mounted in flow cell 160, which can be fabricated from a variety of materials. An optional spectral filter 164, which may be implemented as a filter wheel, is utilized in some embodiments. Utilizing a flow cell, embodiments of the present invention enable imaging of live cells in liquid form at high throughput. Using a flow cell, a narrow depth of focus can be achieved during imaging, resulting in a single layer of red blood cells in some embodiments. Thus, in contrast to a fixed and stained smear, imaging in a flow through modality enables the use of an optical microscope with reduced requirements, including motion control hardware, which would be utilized in a conventional microscope, to image a large number of cells.

In operation, a sample including red blood cells flows through flow cell 160 and a series of images are acquired using detector 168 in a bright-field modality with illumination provided by LED 152. The series of images can include images obtained at different focal planes as well as multiple images that include the same red blood cell. In other embodiments, a single focal plane is utilized. In embodiments in which multiple images of the same red blood cell are obtained, a set of red blood cell images of this particular red blood cell can be provided. As an example, stroboscopic illumination could be utilized to capture a plurality of image frames as the sample flows through the flow cell. In some implementations, the flow cell could be tilted with respect to the x-y plane in such a manner that a particular red blood cell would be positioned at different z-plane positions as it transits the flow cell, enabling formation of set of red blood cell images at different focal planes. Alternatively, the characteristics of the flow pattern may result in the particular red blood cell being imaged at different z-plane positions, different orientations, or the like, resulting in a robust set of images for each particular red blood cell.

Using this set of red blood cell images of a particular red blood cell, the machine learning network can be utilized, producing a suite of confidence scores for each red blood cell image in the set, which can then be used to form a merged confidence score for the particular red blood cell. In other embodiments, in a manner similar to the use of images obtained at different focal planes, image metrics, including contrast, (e.g., coefficient of variation of the image pixels), resolution (e.g., edge definition of the red blood cell images), or the like can be utilized to pre-select the red blood cell image that will be utilized to generate the suite of confidence scores for the particular red blood cell. One of ordinary skill in the art would recognize many variations, modifications, and alternatives.

Figure 1C:
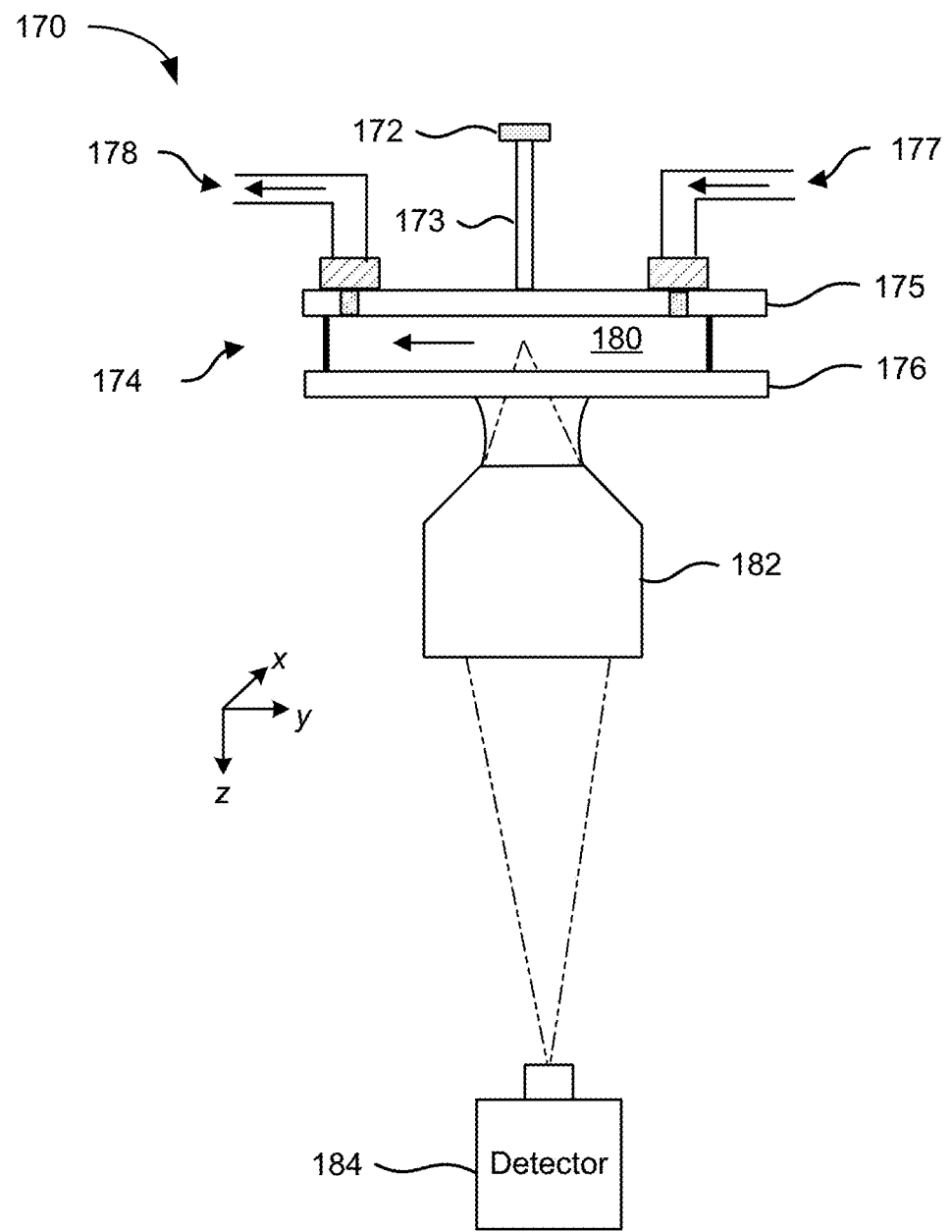
FIG. 1C is a simplified schematic diagram illustrating a single wavelength microscope with an integrated flow cell according to another embodiment of the present invention.

FIG. 1C is a simplified schematic diagram illustrating a single wavelength microscope with an integrated flow cell according to another embodiment of the present invention. The single wavelength microscope illustrated in FIG. 1C shares some common elements with those utilized in FIGS. 1A and 1B and the description provided in relation to FIGS. 1A and 1B is applicable to FIG. 1C as appropriate.

In FIG. 1C, a single wavelength microscope 170 is illustrated that operates in a transmitted light, bright-field configuration using finite conjugate objective lens 182 to form an image on detector 184, which may be implemented using a variety of commercially available cameras. In contrast with the microscope illustrated in FIG. 1B, no fold mirror positioned between finite conjugate objective lens 182 and detector 184 is utilized in this embodiment.

Illumination light is provided by LED 172, which can be operated at 405 nm. As illustrated in FIG. 1C, light emitted by LED 172 is fiber coupled to and illuminates sample volume 180 using optical fiber 173. Samples flow into flow cell 174 through input port 177, pass through sample volume 180, and flow out through output port 178. Sample volume 180 is bounded by substrate 175 and substrate 176, with the spacing between substrate 175 and substrate 176 defining the height of the flow cell measured along the z-axis, which is not drawn to scale in FIG. 1C. Utilizing flow cell 174, embodiments of the present invention enable imaging of live cells in liquid form at high throughput and with accurate control over the positioning of the samples along the z-axis. Thus, in contrast to a fixed and stained smear, imaging in a flow through modality enables the use of an optical microscope with reduced requirements, including motion control hardware, which would be utilized in a conventional microscope, to image a large number of cells.

In operation, a sample including red blood cells flows through flow cell 174 and a series of images are acquired using detector 184 in a bright-field modality with illumination provided by LED 172. In the embodiment illustrated in FIG. 1C, a single focal plane is utilized for imaging and the thickness of sample volume 180 is selected so that the red blood cells are positioned in a single layer as they flow through flow cell 174, although this is not required by the present invention. As an example, stroboscopic illumination could be utilized to capture a plurality of image frames as the sample flows through the flow cell. In some implementations, flow cell 174 could be tilted with respect to the x-y plane in such a manner that a particular red blood cell would be positioned at different z-plane positions as it transits the flow cell, enabling formation of set of red blood cell images at different focal planes. Alternatively, the characteristics of the flow pattern may result in the particular red blood cell being imaged at different z-plane positions, different orientations, or the like, resulting in a robust set of images for each particular red blood cell.

Using this set of red blood cell images of a particular red blood cell, the machine learning network can be utilized, producing a suite of confidence scores for each red blood cell image in the set, which can then be used to form a merged confidence score for the particular red blood cell. In other embodiments, in a manner similar to the use of images obtained at different focal planes, image metrics, including contrast, (e.g., coefficient of variation of the image pixels), resolution (e.g., edge definition of the red blood cell images), or the like can be utilized to pre-select the red blood cell image that will be utilized to generate the suite of confidence scores for the particular red blood cell. One of ordinary skill in the art would recognize many variations, modifications, and alternatives.

Figure 1D:
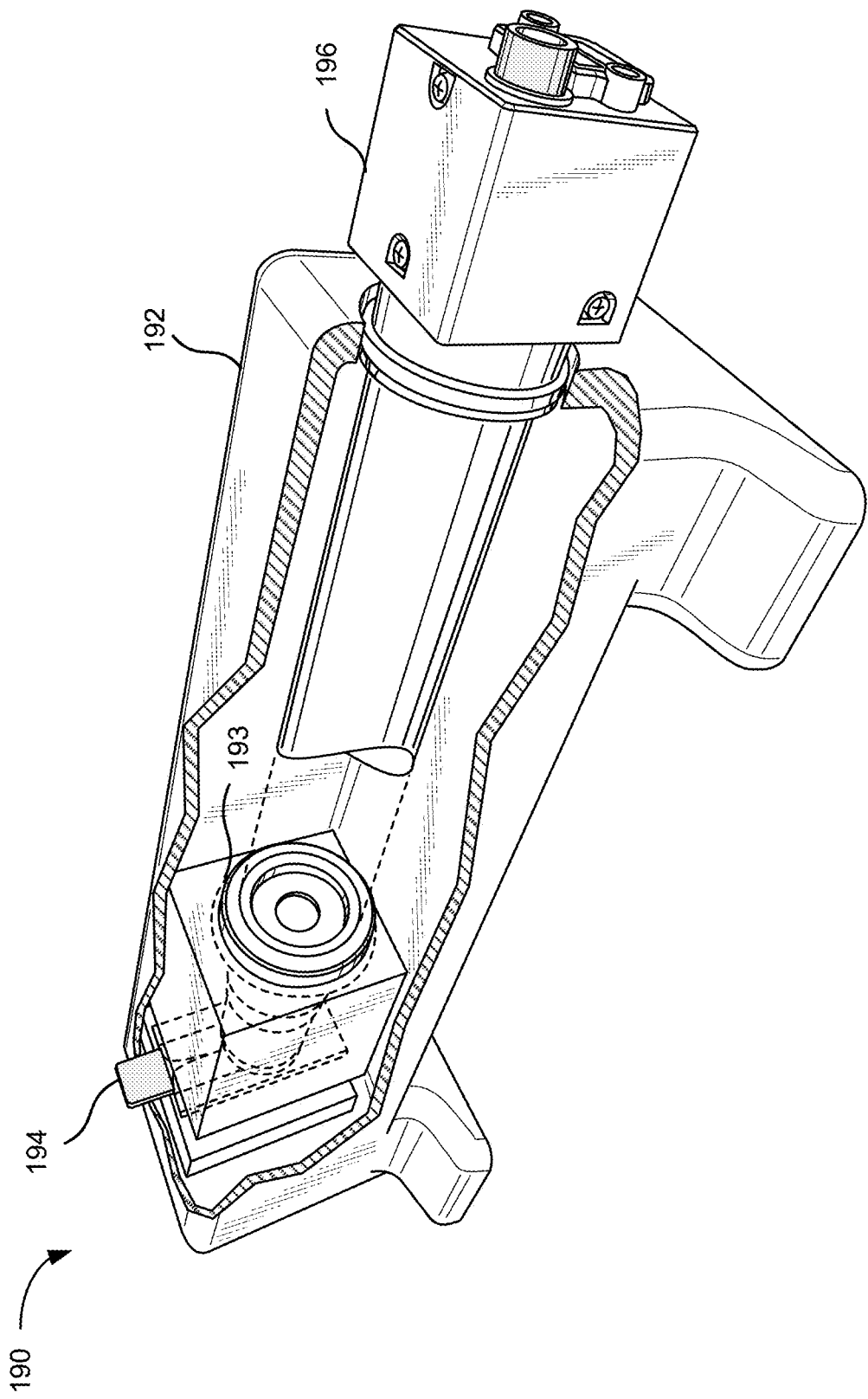
FIG. 1D is a simplified perspective diagram illustrating the single wavelength microscopes with integrated flow cells shown in FIGS. 1B and 1C.

FIG. 1D is a simplified perspective diagram illustrating the single wavelength microscopes with integrated flow cells shown in FIGS. 1B and 1C. Housing 192, which can be a 3D-printed or injection-molded housing provides mechanical support and a controlled environment for various optical elements and a disposable consumable 194 that includes a flow cell through which the blood sample flows during imaging. In some embodiments, disposable consumable 194 enables the blood sample to flow in a manner such that a monolayer of red blood cells is imaged using objective 193 and detector 196 during operation. Light emitted by an LED (not shown but positioned behind disposable consumable 194 is directed to impinge on disposable consumable and focused using objective 193 for imaging at detector 196. Operating using illumination light at 405 nm, objective 193 can be an inexpensive objective rather than a quartz objective, reducing system cost while still achieving high absorption contrast.

The single wavelength microscope illustrated in FIGS. 1B-1D provides a number of benefits not available using conventional techniques. Since typical sample preparation processes including fixing and staining are not utilized, a malarial parasitemia test can be performed and completed before typical sample preparation processes would have been completed. Moreover, since imaging of the sample as it flows through the flow cell is utilized, training requirements for technicians are greatly reduced. The throughput of the microscope can be much higher that achieved using conventional techniques, resulting in the imaging and characterization of a greater number of red blood cell, thereby achieving higher speed and sensitivity than conventional techniques. Moreover, the flow cell modality, by not using blood smears, eliminates blood smear variation as a source of variation in test results. Additionally, because machine learning models are utilized during image analysis, a growing data pipeline can be utilized to continuously improve the machine learning models.

Figure 2A:
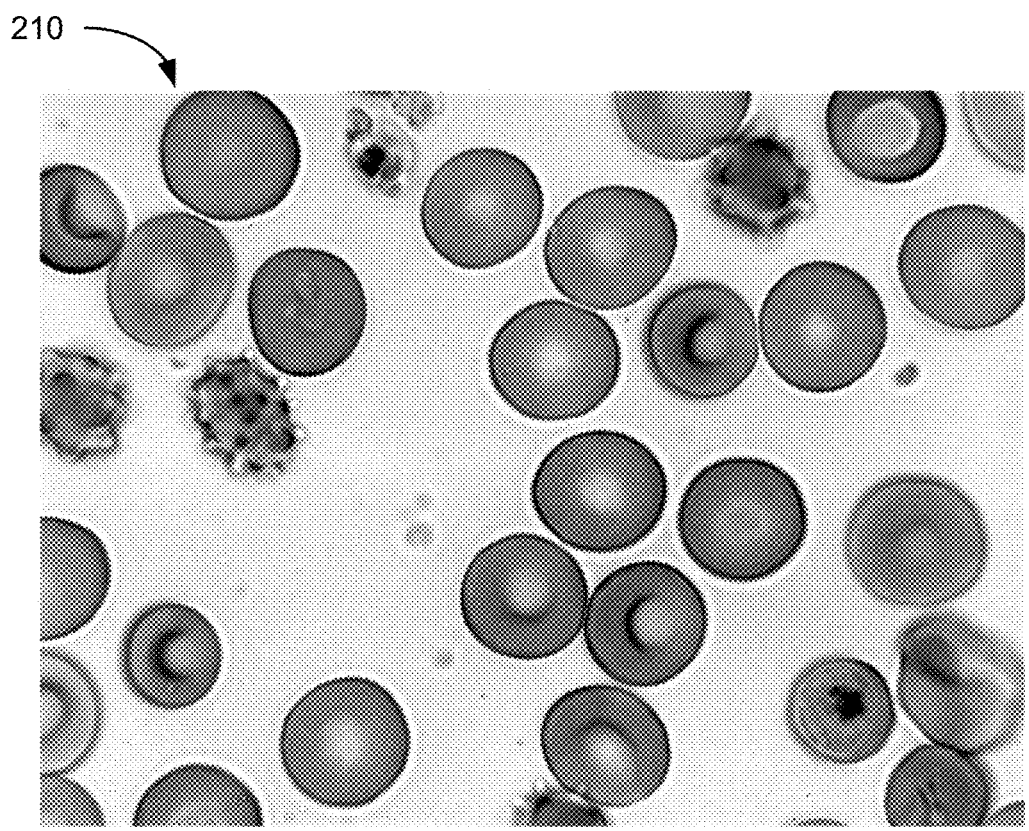
FIG. 2A is an image of red blood cells according to an embodiment of the present invention.

FIG. 2A is an image of red blood cells according to an embodiment of the present invention. In image 210 in FIG. 2A, a number of red blood cells are imaged, with a portion of the imaged red blood cells being parasitized red blood cells.

Although not illustrated in FIG. 2A, some embodiments obtain a set of images arrayed as a focus stack. Referring to FIG. 1, the set of images is obtained by imaging at different positions along the z-axis, resulting in images covering a range of focal planes. This focus stack ensures a robust sampling of the images and images in the focus stack can be utilized, as described more fully below, in providing high quality images for image processing. Moreover, in some embodiments, since the quartz UV objective introduced aberrations such as chromatic focal shift and lateral distortion between color channels, focus stacks for each color of illumination light were re-aligned vertically as well as laterally via Affine transformation to co-register the three color channels. In some embodiments, the number of images in the focus stack is 20 images, with each of the images being separated by a spatial distance measured along the z-axis of 0.5 µm. As described more fully herein, in some embodiments, a focus-measuring algorithm was then used to select the global best focus plane and the five best planes (i.e., global best focus plus two slices on either side) were used for analysis. Of course, embodiments of the present invention are not limited to this particular number of images or spatial distance and greater or lesser numbers of images and spatial distances can be utilized as appropriate to the particular application. One of ordinary skill in the art would recognize many variations, modifications, and alternatives.

Figure 2B:
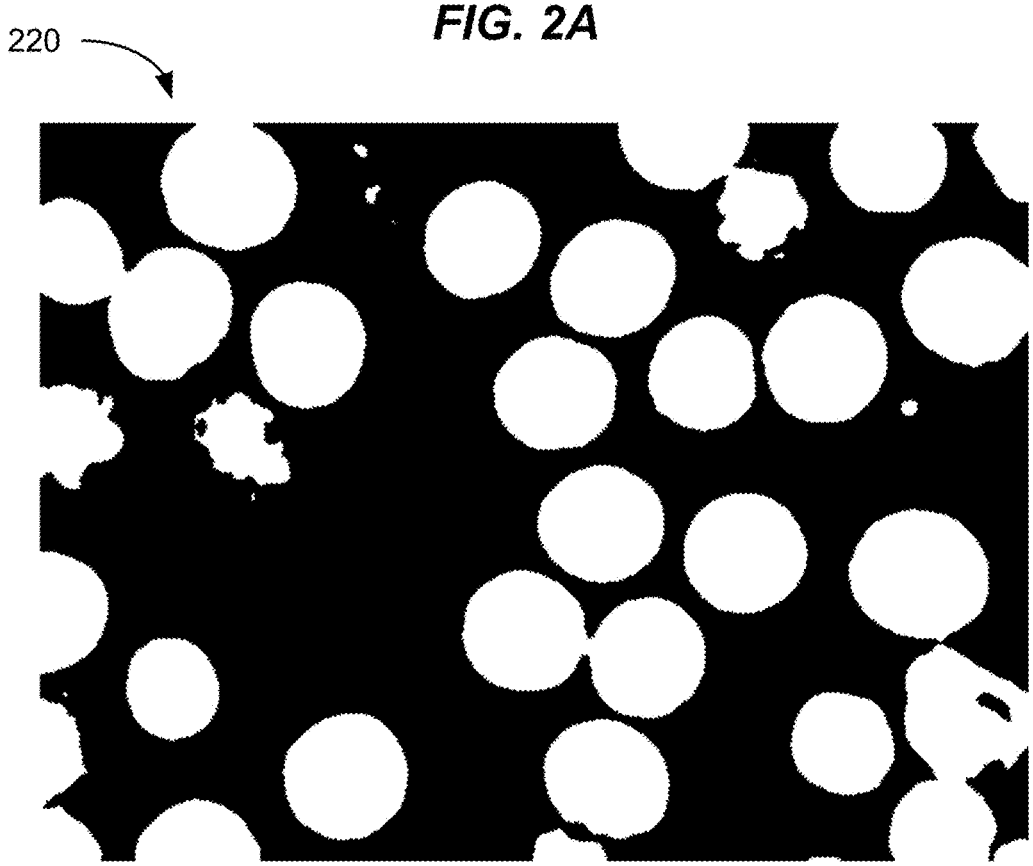
FIG. 2B is a semantic segmentation mask generated using the image of red blood cells illustrated in FIG. 2A.

FIG. 2B is a semantic segmentation mask generated using image 210 of red blood cells illustrated in FIG. 2A. In order to generate semantic segmentation mask 220, semantic segmentation was performed by a ResNet-50 machine learning system that was manually trained by segmenting red blood cells with diverse appearances and parasite lifecycle stages. Binary masks generated by segmentation were post-processed by an instancing algorithm that separated adjacent cells and also rejected those falling outside a certain size and roundness range, or touching the image boundary. The primary rationale for morphological filtering was to exclude cells with edge-on orientation, those with high degree of crenation, or overlapping cells. Although this particular semantic segmentation process was utilized, it will be evident to one of skill in the art that other semantic segmentation processes can be utilized within the scope of the present invention. Additionally, as described in relation to FIGS. 10A and 14, some embodiments of the present invention do not utilize a semantic segmentation process and generate sets of red blood cell images using other techniques.

Figure 2C:
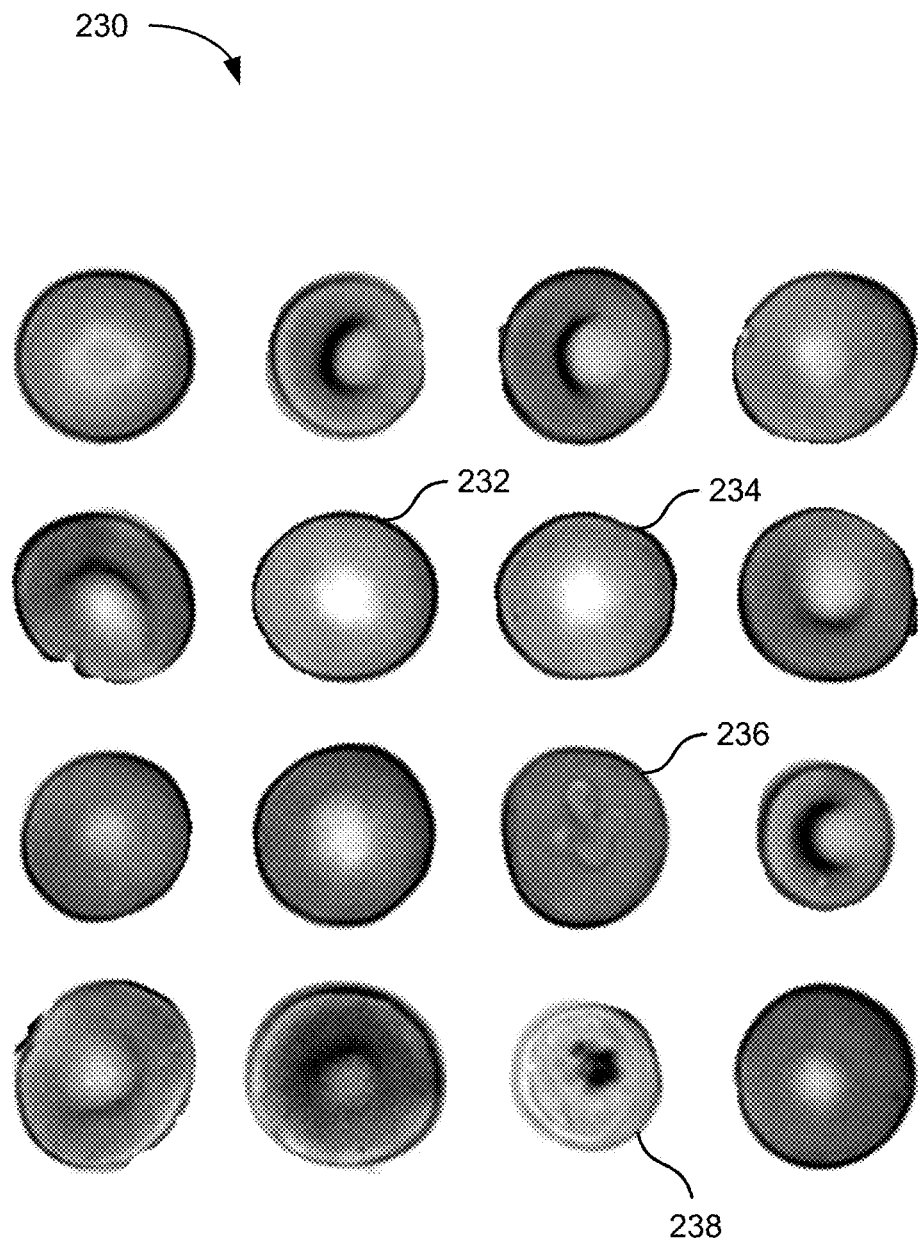
FIG. 2C is a set of filtered images of red blood cells according to an embodiment of the present invention.

FIG. 2C is a set of filtered images of red blood cells according to an embodiment of the present invention. Utilizing image 210 including a number of red blood cells and semantic segmentation mask 220, a set of filtered images 230 of red blood cells is generated. These filtered images are also referred to as red blood cell images throughout the present disclosure. As an example, red blood cell instances were masked using semantic segmentation mask 220 and filtered by size and shape parameters to reduce the number of edge-on, misshapen, and/or clipped cells. This process was performed once for the best-focused image in the focus stack, and the mask 220 was applied likewise to a number of adjacent images in the focal stack.

Referring to FIG. 2C, a number of different filtered images of red blood cells are illustrated. Filtered red blood cell image 232 is an image of a healthy red blood cell, filtered red blood cell image 234 is another image of a healthy red blood cell, filtered red blood cell image 236 is an image of a red blood cell with a ring-stage parasite, and filtered red blood cell image 238 is an image of a red blood cell with a schizont-stage parasite. Given the filtered images of red blood cells shown in FIG. 2C, classification of the red blood cells could be performed. As will be described more fully below, these filtered images of red blood cells are utilized as inputs into the deep learning network used to produce classifications.

In an embodiment, in order to provide high quality images for classification, the focus stack is processed to capture a range of potential positions over which parasite features might be used for classification. This processing can include computing of a global best focus metric on the whole focus stack and selecting the five best focus images, also referred to as slices. Using the multi-wavelength microscope 100 illustrated in FIG. 1, five best focus images can be obtained for each of the three wavelengths, resulting in fifteen best focus images that can be processed independently. Of course, embodiments of the present invention are not limited to five slices or three wavelengths and a greater or lesser number of slices and wavelengths can be utilized as appropriate to the particular application.

FIGS. 3A-3D are charts illustrating probability distributions for four example filtered images according to an embodiment of the present invention. In order to generate the probability distributions illustrated in FIGS. 3A-3D, the filtered red blood cell images (e.g., as shown in FIG. 2C) were classified by a retrained GoogLeNet machine learning architecture, whose output assigns a probability for each category, thereby providing the probabilities shown for the four filtered red blood cell images shown in FIG. 3A-3D.

Results were typically very high confidence for the large majority of cells. As will be explained in additional detail below, in some cases, the two late stages of trophozoite and schizont could be classified with higher accuracy if treated as a single "late-stage" category.

To accelerate the learning process, initial re-training was achieved by manually sorting a ~5,000 count subset of all individual red blood cell instance images into specified categories. A machine classifier was trained on this initial subset. Subsequently, larger annotated datasets for training and validation were achieved by exporting the fraction of automatically-classified cells with low confidence scores for manual annotation, which were then used to overwrite the original machine labels manually. In this way, high-confidence annotated datasets including ~80,000 cells were generated. Given the fully-annotated datasets, new classifiers were re-trained on a random 90% partition that included the five best focus slices. Using additional focus slices served as a natural augmentation of the training dataset size, while simultaneously including examples of slightly de-focused images in the training, in order to reduce the system's dependence on achieving an exact focus.

Using this method, an unmodified four-category classifier was able to achieve an overall label-free classification accuracy of 98.1%. Full confusion matrices are presented in FIGS. 5A and 5B, displaying the precision, recall, fractional composition, and misclassification rates for each category. It should be noted that even for the highest expected parasite densities, either laboratory or clinical, samples are always composed predominantly of healthy cells. Moreover, it should be noted that unless the culture is artificially synchronized to the late-stages, ring-stage parasites typically predominate over the more mature trophozoites, and the short-lived schizont stage. The highly unbalanced nature of the sample composition biases the cross-entropy loss function and obscures contributions from minority classes during classifier training. In order to compensate for the imbalance during classifier training, the following weighted cross-entropy forward loss function (L) is used:

$$L = -\frac{1}{N}\sum_{n=1}^{N}\sum_{i=1}^{K}\frac{b_i}{n_i}T_{ni}\log(Y_{ni})$$

where N is the total number of training images, m are the fractional representation of each class, $b_i$ are empirically determined training biases, K is the number of classes, $Y_{ni}$ are the predictions, and $T_{ni}$ are the targets (human annotated labels).

Thus, some embodiments introduced the term $$\frac{b_i}{n_i}$$

in order to re-normalize the training weights to account for class imbalance. As a result, training bias towards dominant classes can be eliminated, such that the resulting classifier's FPR and FNR will, on average, be balanced. For our specific training and validation datasets, it was determined that the optimal values for $b_i$ are [4, 2, 1, 1], corresponding to the classes [healthy, ring, trophozoite, schizont], to re-balance confusion matrices that resulted from processing real samples. The relative balance between false positive and false negative rates is further discussed in the context of confidence thresholding and extrinsic validation.

Figure 3A:
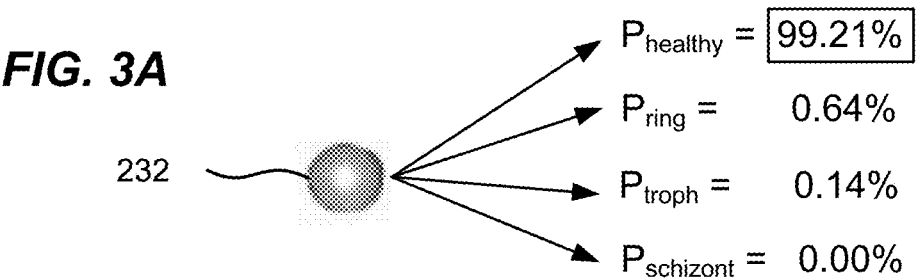
FIGS. 3A-3D are charts illustrating probability distributions for four example filtered red blood cell images according to an embodiment of the present invention.

Referring once again to FIG. 3A, filtered red blood cell image 232, which is an image of a healthy red blood cell, is illustrated along with the probabilities of the healthy red blood cell being a healthy cell ($P_{healthy}$), a cell with a ring-stage parasite ($P_{ring}$), a cell with a trophozoite-stage parasite ($P_{troph}$), or a cell with a schizont-stage parasite ($P_{schizont}$). As shown in FIG. 3A, the probability that the cell is healthy is high (i.e., P=99.21%) and the probability that the cell has a parasite at one of the various stages is low (i.e., $P_{ring}$=0.64%, $P_{troph}$=0.14%, and $P_{schizont}$=0.00%). Accordingly, the classifier has predicted with a high probability that filtered red blood cell image 232 is associated with a healthy cell.

Thus, a suite of confidence scores represented as probabilities is generated for each red blood cell image in the set of red blood cell images. Each of the confidence scores in the suite of confidence scores associated with a particular red blood cell defines a probability that the particular red blood cell is associated with one of a plurality of malaria parasite lifecycle stages. In the embodiments described herein, the suite of confidence scores can include a first confidence score associated with a malaria-free red blood cell, a second confidence score associated with a ring-stage parasite, a third confidence score associated with a trophozoite-stage parasite, and a fourth confidence score associated with a schizont-stage parasite.

Figure 3B:
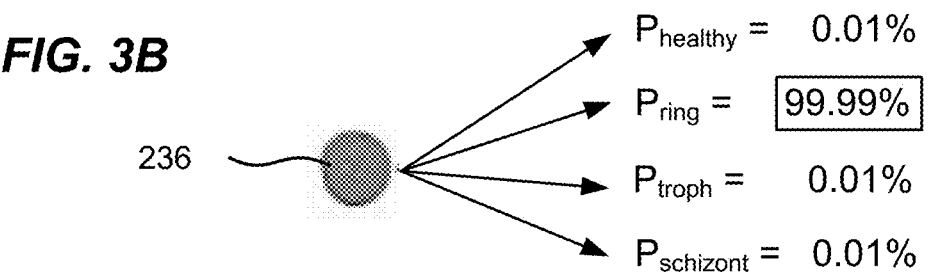

In FIG. 3B, filtered red blood cell image 236, which is an image of a red blood cell with a ring-stage parasite, is illustrated along with the probabilities of the red blood cell with the ring-stage parasite being a healthy cell ($P_{healthy}$), a cell with a ring-stage parasite ($P_{ring}$), a cell with a trophozoite-stage parasite ($P_{troph}$), or a cell with a schizont-stage parasite ($P_{schizont}$). As shown in FIG. 3B, the probability that the cell has a ring-stage parasite is high (i.e., P=99.99%) and the probability that the cell is healthy or is a cell with a trophozoite-stage parasite or a schizont-stage parasite is low (i.e., $P_{healthy}$=0.01%, $P_{troph}$=0.01%, and $P_{schizont}$=0.01%). Accordingly, the classifier has predicted with a high probability that filtered red blood cell image 236 is associated with a cell with a ring-stage parasite. It should be noted that although the presence of the ring-stage parasite is subtle in filtered red blood cell image 236, the classifier has predicted a high probability of this state of the cell.

Figure 3C:
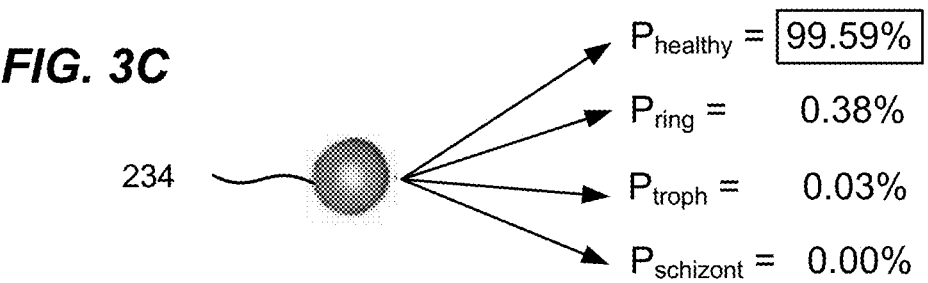

In FIG. 3C, filtered red blood cell image 234, which like filtered red blood cell image 232, is an image of a healthy red blood cell, is illustrated along with the probabilities of the healthy red blood cell being a healthy cell ($P_{healthy}$), a cell with a ring-stage parasite ($P_{ring}$), a cell with a trophozoite-stage parasite ($P_{troph}$), or a cell with a schizont-stage parasite ($P_{schizont}$). As shown in FIG. 3C, the probability that the cell is healthy is high (i.e., P=99.59%) and the probability that the cell has a parasite at one of the various stages is low (i.e., $P_{ring}$=0.38%, $P_{troph}$=0.03%, and $P_{schizont}$=0.00%). Accordingly, the classifier has predicted with a high probability that filtered red blood cell image 234 is associated with a healthy cell.

Figure 3D:
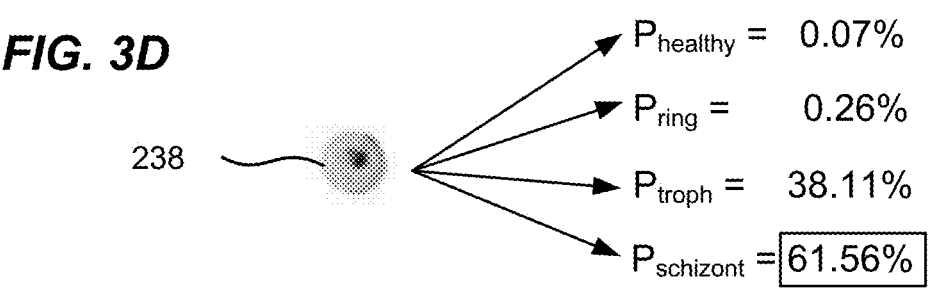

In FIG. 3D, filtered red blood cell image 238, which is an image of a red blood cell with a schizont-stage parasite, is illustrated along with the probabilities of red blood cell with the schizont-stage parasite being a healthy cell ($P_{healthy}$), a cell with a ring-stage parasite ($P_{ring}$), a cell with a trophozoite-stage parasite ($P_{troph}$), or a cell with a schizont-stage parasite ($P_{schizont}$). As shown in FIG. 3D, the probability that the cell has a schizont-stage parasite is not high (i.e., $P_{schizont}$=61.56%) in comparison with the other largest probabilities for the three cells already discussed. Rather, the sum of the probability that the cell has a trophozoite-stage parasite ($P_{troph}$=38.11%) and the probability that the cell has a schizont-stage parasite ($P_{schizont}$=61.56%) sum to $P_{troph}$+$P_{schizont}$=99.67%, which is comparable to the other largest probabilities for the three cells already discussed.

Accordingly, the probability that filtered red blood cell image 238 is associated with a cell having a late-stage parasite is high while the probability that the cell is healthy or is a cell with a ring-stage parasite is low (i.e., $P_{healthy}$=0.07%, $P_{ring}$=0.26%). As discussed more fully below in relation to FIG. 5B, by reducing the number of classification categories to three: healthy, early (i.e., ring-stage), and late (i.e., trophozoite-stage or schizont-stage), the classifier can predict with a high probability that filtered red blood cell image 238 is associated with a cell with a late-stage parasite. This classification into healthy, early, and late is consistent with the biology of the malaria parasite since the transition from the trophozoite-stage to the schizont-stage is continuous.

Figure 4A:
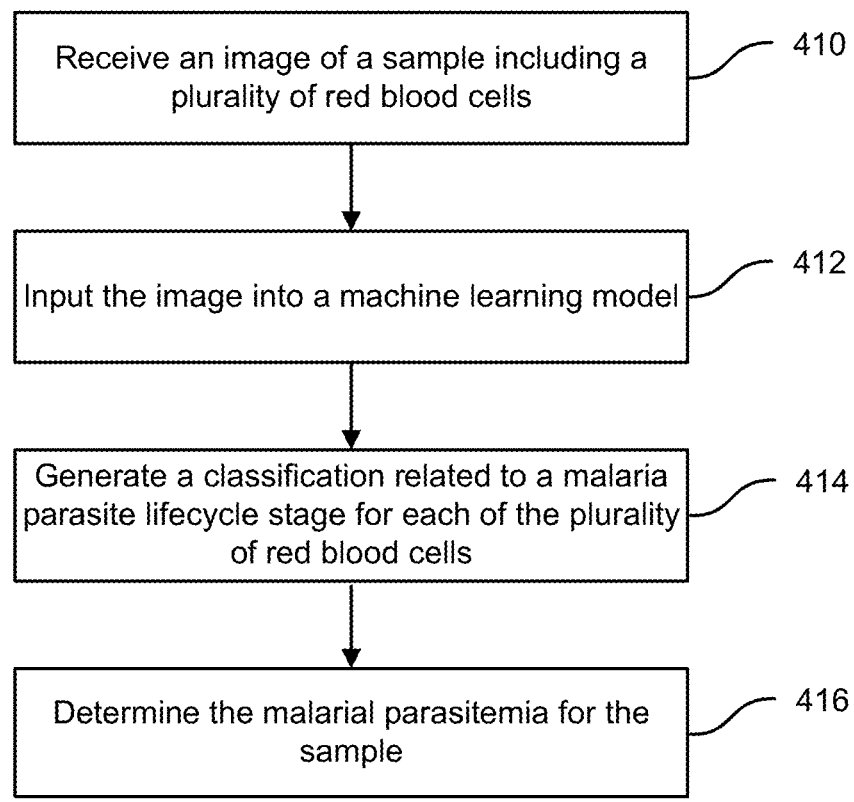
FIG. 4A is a simplified flowchart illustrating a method of measuring malaria parasitemia according to an embodiment of the present invention.

FIG. 4A is a simplified flowchart illustrating a method of measuring malaria parasitemia according to an embodiment of the present invention. The method 400 includes receiving an image of a sample (e.g., a liquid sample) including a plurality of red blood cells (410). The image of the sample can be one of a plurality of images of the sample. Each of the plurality of images can be associated with a different focal plane or a different wavelength. The sample can be free of any staining, including Giemsa staining. Additionally, the image of the sample can be a bright-field image. As an example, image can be captured by disposing the sample on a sample stage, illuminating the sample with optical radiation, and capturing the image of the sample. In some embodiments, the sample stage comprises a flow cell through which the sample flows during imaging.

The method also includes inputting the image of the sample into a machine learning model (412) and generating, using the machine learning model, a classification related to a malaria parasite lifecycle stage for each of the plurality of red blood cells (414). Given the classification for each of the plurality of red blood cells, the method further includes determining the malarial parasitemia for the sample (416).

In some embodiments, the classification related to the malaria parasite lifecycle stage comprises a suite of confidence scores. Each of the confidence scores in the suite of confidence scores defines a probability that the particular red blood cell is associated with one of a plurality of malaria parasite lifecycle stages. In other embodiments, the classification defines a label for each of the plurality of red blood cells, for example, a healthy red blood cell (i.e., a malaria-free red blood cell), a red blood cell with a ring-stage parasite, a red blood cell with a trophozoite-stage parasite, or a red blood cell with a schizont-stage parasite.

An overall parasitemia for the sample can be computed by dividing the number of cells that are parasitemic by the total number of cells, with the number of cells that are parasitemic defined by the sum of the cells for which the labels are other than healthy.

It should be appreciated that the specific steps illustrated in FIG. 4A provide a particular method of measuring malaria parasitemia according to an embodiment of the present invention. Other sequences of steps may also be performed according to alternative embodiments. For example, alternative embodiments of the present invention may perform the steps outlined above in a different order. Moreover, the individual steps illustrated in FIG. 4A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4B:
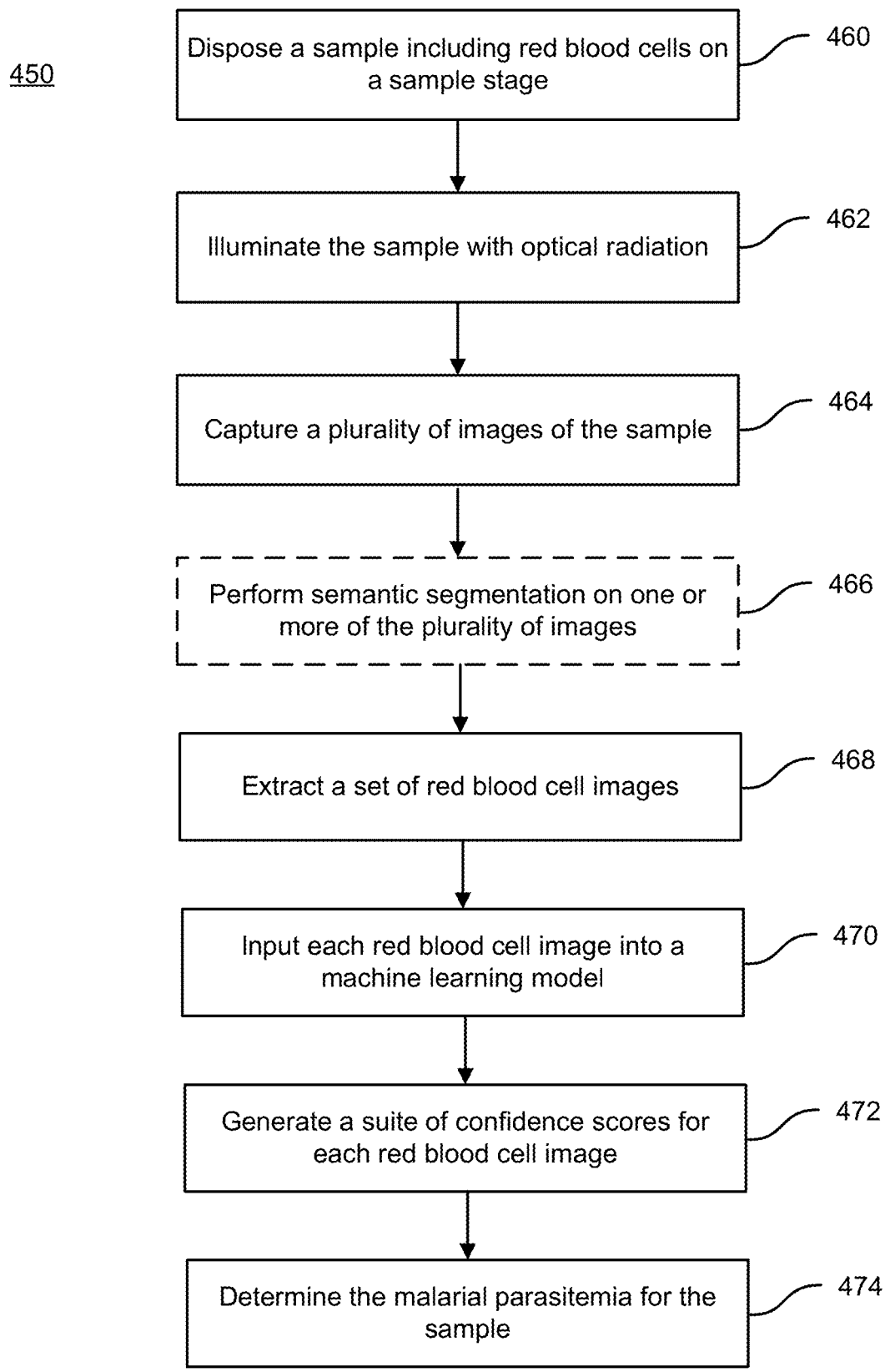
FIG. 4B is a simplified flowchart illustrating a method of measuring malaria parasitemia according to another embodiment of the present invention.

FIG. 4B is a simplified flowchart illustrating a method of measuring malaria parasitemia according to another embodiment of the present invention. The method 450 can be considered to utilize a two-step process in which object detection is performed to provide a set of red blood cell images followed by classification of each of the red blood cell images in the set of red blood cell images. The method 450 includes disposing a sample including red blood cells on a sample stage (460). In some embodiments, the sample stage is implemented as a flow cell through which the sample, which can include live cells, flows during measurement. Thus, the sample can be in liquid form and not fixed during measurement. Moreover, the sample can be free of Giemsa staining in contrast with conventional microscopy methods. The method also includes illuminating the sample with optical radiation (462) and capturing a plurality of images of the sample (464). The optical radiation, which can be generated using a light emitting diode (LED) can include light in the ultraviolet light wavelength range or light in the visible range. In a particular implementation, light having a wavelength between 350 nm and 420 nm is utilized, for example, light produced by a near-UV LED operating at 405 nm. Each image of the plurality of images can be associated with a different focal plane.

The method further includes performing semantic segmentation on one or more of the plurality of images (466) and extracting, from the one or more of the plurality of images, a set of red blood cell images (468). Each red blood cell image is associated with a particular red blood cell.

For each red blood cell image in the set of red blood cell images, the method includes inputting each red blood cell image into a machine learning model (470) and generating, using the machine learning model, a suite of confidence scores (472). Each of the confidence scores in the suite of confidence scores defines a probability that the particular red blood cell is associated with one of a plurality of malaria parasite lifecycle stages. In the embodiments described herein, the suite of confidence scores can include a first confidence score associated with a malaria-free red blood cell, a second confidence score associated with a ring-stage parasite, a third confidence score associated with a trophozoite-stage parasite, and a fourth confidence score associated with a schizont-stage parasite. Although the four malaria parasite lifecycle stages of healthy, ring-stage, trophozoite-stage, and schizont-stage are illustrated in FIGS. 3A-3D and discussed in relation to FIGS. 4A and 4B, embodiments of the present invention are not limited to an analysis including these four lifecycle stages and other stages and/or forms of the parasite are included within the scope of the present invention. As an example, one or more of the four illustrated stages could be supplemented or replaced with other stages including dendritic rings, canonical rings, or the gametocyte stage. One of ordinary skill in the art would recognize many variations, modifications, and alternatives.

Based on the suites of confidence scores, the method includes determining the malarial parasitemia for the sample (474) by identifying cells that are parasitemic as those for which the highest confidence score is the second, third, or fourth confidence score in the suite of confidence scores. The malarial parasitemia can be categorized as an early stage parasitemia associated with a ring-stage parasite or a late-stage parasitemia associated with a trophozoite-stage or a schizont-stage parasite.

In some embodiments, cells for which the third confidence score is the highest confidence score in the suite of confidence scores for the cell or the fourth confidence score is the highest confidence score in the suite of confidence scores for the cell can be summed in order to determine that the malarial parasitemia is a late-stage parasitemia. An overall parasitemia can be computed by dividing the number of cells that are parasitemic by the total number of cells, with the number of cells that are parasitemic defined by the sum of the cells for which the second confidence score, the third confidence score, or the fourth confidence score is the highest confidence score in the suite of confidence scores for the cell.

In some embodiments, a thresholding technique is utilized in which, prior to determining the malarial parasitemia for the sample, the method includes determining that a highest confidence score in a particular suite of confidence scores is less than a threshold and discarding that particular suite of confidence scores.

It should be appreciated that the specific steps illustrated in FIG. 4B provide a particular method of measuring malaria parasitemia according to another embodiment of the present invention. Other sequences of steps may also be performed according to alternative embodiments. For example, alternative embodiments of the present invention may perform the steps outlined above in a different order. Moreover, the individual steps illustrated in FIG. 4B may include multiple sub-steps that may be performed in various sequences as appropriate to the individual step. Furthermore, additional steps may be added or removed depending on the particular applications. One of ordinary skill in the art would recognize many variations, modifications, and alternatives.

The disclosed method may comprise using a general-purpose imager using machine learning to analyze a sample and classify it for automated diagnostic and classification based on prior training data. The method may employ deep learning based image processing to automatically analyze a sample and image it in full in one shot or through staging, in either case, with or without the assistance of a human or specific heuristics.

Examples of machine learning models include a random forests model, including deep random forests, neural networks, including recurrent neural networks and convolutional neural networks, graph-based convolutional neural networks, quaternion neural networks, restricted Boltzmann machines, recurrent tensor networks, and gradient boosted trees. The term "classifier" (or classification model) is sometimes used to describe all forms of classification models including deep learning models (e.g., neural networks having many layers), random forest models, decision trees, a support vector machine (SVM), neural networks, and K-nearest neighbors (KNN), and may utilize boosting (i.e., AdaBoost).

Training a machine learning system may employ a training set that includes a plurality of images having cells and/or other features of interest in samples. Collectively, such images may be viewed as a training set. For instance, the images in the training set may include two or more different types of sample features associated with two or more conditions that are to be classified by the trained model. In various embodiments, the images have their features and/or conditions identified by a reliable source such as a trained pathologist or morphologist. In certain embodiments, the sample features and/or conditions are classified by a classifier other than an experienced human pathologist or morphologist. For example, the qualified classifier may be a reliable pre-existing classification model. Training methods in which the sample features and/or conditions are pre-identified and the identifications are used in training are termed supervised learning processes. Training methods in which the identities of sample features and/or conditions are not used in training are termed unsupervised learning processes. Both supervised and unsupervised learning may be employed with the disclosed processes and systems.

Figure 5A:
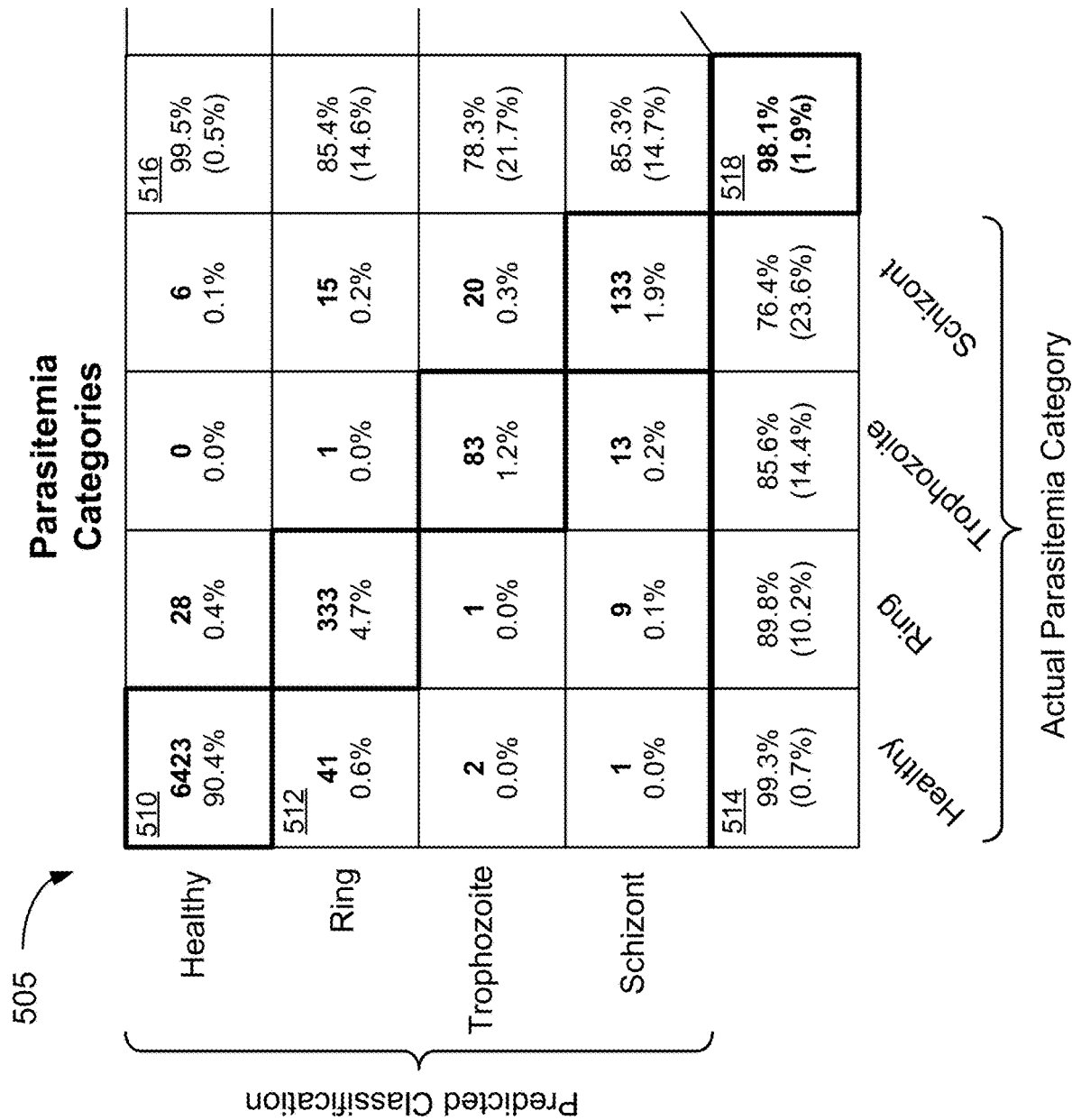
FIGS. 5A and 5B illustrate a set of confusion matrices generated during malaria parasitemia classification according to an embodiment of the present invention.
Figure 5B:
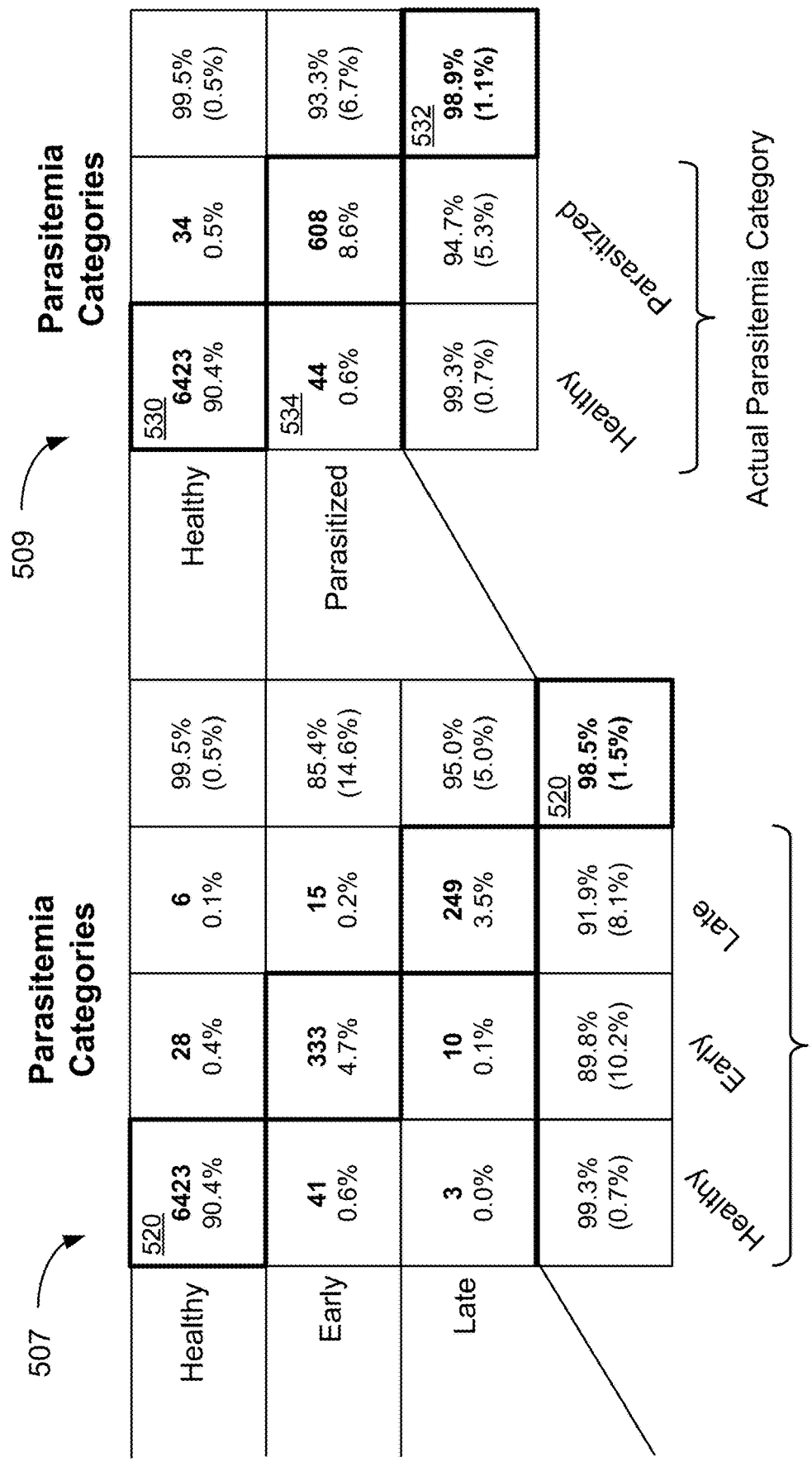

FIGS. 5A and 5B show a set of confusion matrices generated during malaria parasitemia classification according to an embodiment of the present invention. The confusion matrix includes the labels assigned for training (i.e., ground truth) as Actual Parasitemia Category and the labels predicted by the classifier as Predicted Classification.

In FIGS. 5A and 5B, the rates of correct and incorrect classification of all the instances in the validation dataset (a 10% random partition of all the annotated data) are summarized in the form of confusion matrices. The raw confusion matrices compare these results for all four categories from the classifier. The confusion matrices include confusion matrix 505 including four categories of parasitemia, confusion matrix 507 including three categories of parasitemia, and confusion matrix 509 including two categories of parasitemia. As illustrated by confusion matrix 505, the four-category classifier achieved a raw overall accuracy of 98.1%, and combined misclassification of all types occurs at a rate of 0.7%.

Referring to FIG. 5A, cell 510 indicates the number of cells that were actually healthy and also scored as healthy by the classifier, a total of 6423 cells, which made up 90.4% of the population. Cell 512 indicates the number of cells that were actually healthy, but scored as having a ring-stage parasite by the classifier, a total of 41 cells, which made up 0.6% of the population. As discussed more fully herein, the main source of error is associated with the false positive result for cells with ring-stage parasites, shown by the 0.6% value in cell 512. It should be noted that this 0.6% false positive rate is also present in confusion matrices 507 and 509. The ring-stage parasite is the earliest stage of parasite of the three parasitemia categories, is the most prevalent, and is the most difficult to detect.

Cell 514 indicates that the total number of healthy cells was 99.3% of the population, leaving 0.7% of the cells as either having ring-stage, trophozoite stage, or schizont-stage parasites. Cell 516 indicates that within the set of cells that were classified as healthy by the classifier, 99.5% of the cells in this set were indeed healthy. Cell 518 indicates that 98.1% of all cells in the dataset were classified as having the same category as the actual category. As will be evident to one of skill in the art, the right column of confusion matrix 505 indicates the specificity, which indicates, for each of the given categories, the number of cells classified in the given category that were actually in the given category. The bottom row of confusion matrix 505 indicates, for each of the actual classifications, the number of cells that were actually in a given category that were classified as in the actual category to which they belonged.

The inventors have determined that in some instances, the lifecycle stage appeared to be transitional, shared morphological features common to more than one stage, or simply were difficult to distinguish for other reasons. In particular, rings transitioning to the trophozoite stage began accumulating heme (visible as dark highly-absorbing puncta) with highly variable morphologies, while some early trophozoites had not yet grown in size, but exhibited heme accumulations. Likewise, many mature trophozoites had grown large in size and accumulated substantial heme, while some early schizonts had only begun displaying increased cytoplasmic texture indicative of nascent merozoite formation. In order to address these findings, the statistics for merged classifiers with three- and two-category schemes were analyzed, which resulted in higher accuracy by not attempting to distinguish borderline transitional instances, at the cost of reduced granularity.

As illustrated by confusion matrix 507, the three-category classifier was created by using a single "late" category in which the summation of the trophozoite and schizont probabilities resulted in higher confidence and higher accuracy. The three-category output better reflected partial information in the case of high total confidence spread across two or more categories. It should be noted that by merging the trophozoite and schizont categories, the precision and recall of the resulting "late" category is substantially improved as is the overall accuracy (98.5%), reflecting a reduction in the overall number of misclassified cells.

As illustrated in confusion matrix 509, further reduction of the model to two categories (i.e., healthy and parasitized) results in an overall accuracy of 98.9%, a parasitic recall rate of 94.7%, and a false-positive rate of 0.7%.

FIG. 6A is a histogram of classifier confidence for healthy red blood cells classified as healthy according to an embodiment of the present invention. FIG. 6B is a histogram of classifier confidence for red blood cells having ring-stage malaria parasites classified as healthy according to an embodiment of the present invention. FIG. 6C is a histogram of classifier confidence for red blood cells having late-stage malaria parasites classified as healthy according to an embodiment of the present invention. FIG. 6D is a histogram of classifier confidence for healthy red blood cells classified as having ring-stage malaria parasites according to an embodiment of the present invention. FIG. 6E is a histogram of classifier confidence for red blood cells having ring-stage malaria parasites classified as having ring-stage malaria parasites according to an embodiment of the present invention. FIG. 6F is a histogram of classifier confidence for red blood cells having late-stage malaria parasites classified as having ring-stage malaria parasites according to an embodiment of the present invention. FIG. 6G is a histogram of classifier confidence for healthy red blood cells classified as having late-stage malaria parasites according to an embodiment of the present invention. FIG. 6H is a histogram of classifier confidence for red blood cells having ring-stage malaria parasites classified as having late-stage malaria parasites according to an embodiment of the present invention. FIG. 6I is a histogram of classifier confidence for red blood cells having late-stage malaria parasites classified as having late-stage malaria parasites according to an embodiment of the present invention.

As described herein, FIGS. 6A-6I illustrate the effect of confidence thresholding on the parasitemia data. In these histograms, the distributions of confidence scores are stratified by predicted and human labels and arranged in the form of a confusion matrix. Cells that were classified as healthy and were actually healthy are shown in FIG. 6A as a histogram based on classifier confidence in percentage form.

As illustrated in FIG. 6A, the large majority of the population is classified with very high confidence (healthy cell median confidence is 99.9%), presumably due to the excess of available healthy cell examples in the training dataset as compared to parasitized examples. However, the confidence distribution has a long tail extending into the low-confidence regime (<90%), including values as low as 50%. This could be explained by many factors including variation of individual parasite anatomy, life cycle stage, relative image focus, non-standard red blood cell morphology, obstruction by other red blood cells, or external stochastic factors such as mechanical vibrations or stage drift. In fact, the inventors have determined that misshapen cells, caused, for example, by being removed from the human body for an extended time, result in a significant number of the false positives. Without limiting embodiments of the present invention, the inventors believe that that this subset of cells might exhibit a higher than average error rate, and that excluding it from analysis would be net beneficial to the results.

Indeed, as shown in FIGS. 6B, 6C, 6D, 6F, 6G, and 6H, the median confidence scores for off-diagonal matrix elements (incorrectly scored cells) were found to be substantially lower than those for on-diagonal positions (correctly scored cells) shown in FIGS. 6A, 6E, and 6I, suggesting that without prior knowledge of ground truth, the results could be improved by confidence thresholding. In practice, the low median confidence scores for off-diagonal matrix elements indicate that for cells that were incorrectly scored, the average confidence score provided by the classifier was low. Thus, by thresholding the confidence scores, these incorrectly scored cells can be removed.

However, it should be noted that removal of data poses an inherent risk of bias and should be applied judiciously. Further, knowledge of the statistics underlying the distribution of confidence scores and their typical correlation with predictive power is essential in applying an appropriate threshold value on classifier confidence. Selection of optimal threshold value is a primarily a trade-off between error reduction and introduction of bias. As the threshold value is increased, the rate of rejection of misclassified cells should be higher than the incremental rejection of correctly-classified cells, and the estimate of overall sample composition should improve. However, certain categories of may be inherently more difficult to score than others, implying lower confidence values on average. In this case, as the threshold value is increased, the more difficult categories will be erroneously rejected at higher rates than easier categories, introducing bias error. In other words, increasing the confidence threshold rejects parasitized cells at a higher relative rate compared to healthy cells, leading to a decrease in the observed parasitemia as a function of threshold value, as the measured parasitemia transitions from over-counted to under-counted. Thus, there is a tradeoff between elimination of false positives and the recall performance of the classifier. One method of resolving this tradeoff is to choose a maximum acceptable false positive rate as an independent parameter. For stringent applications at low parasitemia levels, the false positive rate must be held as low as possible, at the cost of recall rate. If the total number of acquired cell images is high enough, then it is possible to account for the reduced recall rate and obtain accurate results.

As a performance metric, the estimated overall sample composition accuracy was considered, as opposed to optimization for any one particular element of the confusion matrix. Indeed, the pragmatic output from the machine classifier is the estimated overall sample composition as opposed to the correctness of any one individual cell. Correspondingly, it was determined that the utility of confidence thresholding was limited in cases where the confusion matrix was already balanced across the diagonal, but more effective in cases where there were more false-positives than false-negatives (or vice-versa). In fact, balanced classifier results were usually worsened with increasing threshold. It should be noted that the four-category classifier often has difficulty distinguishing late trophozoites from early schizonts, despite a high combined confidence. Confidence thresholding in that case, therefore, tends to erroneously reject late-stage parasites. Merging into a combined "late" stage category resolves this issue and results in a greater improvement with threshold application.

Figure 7:
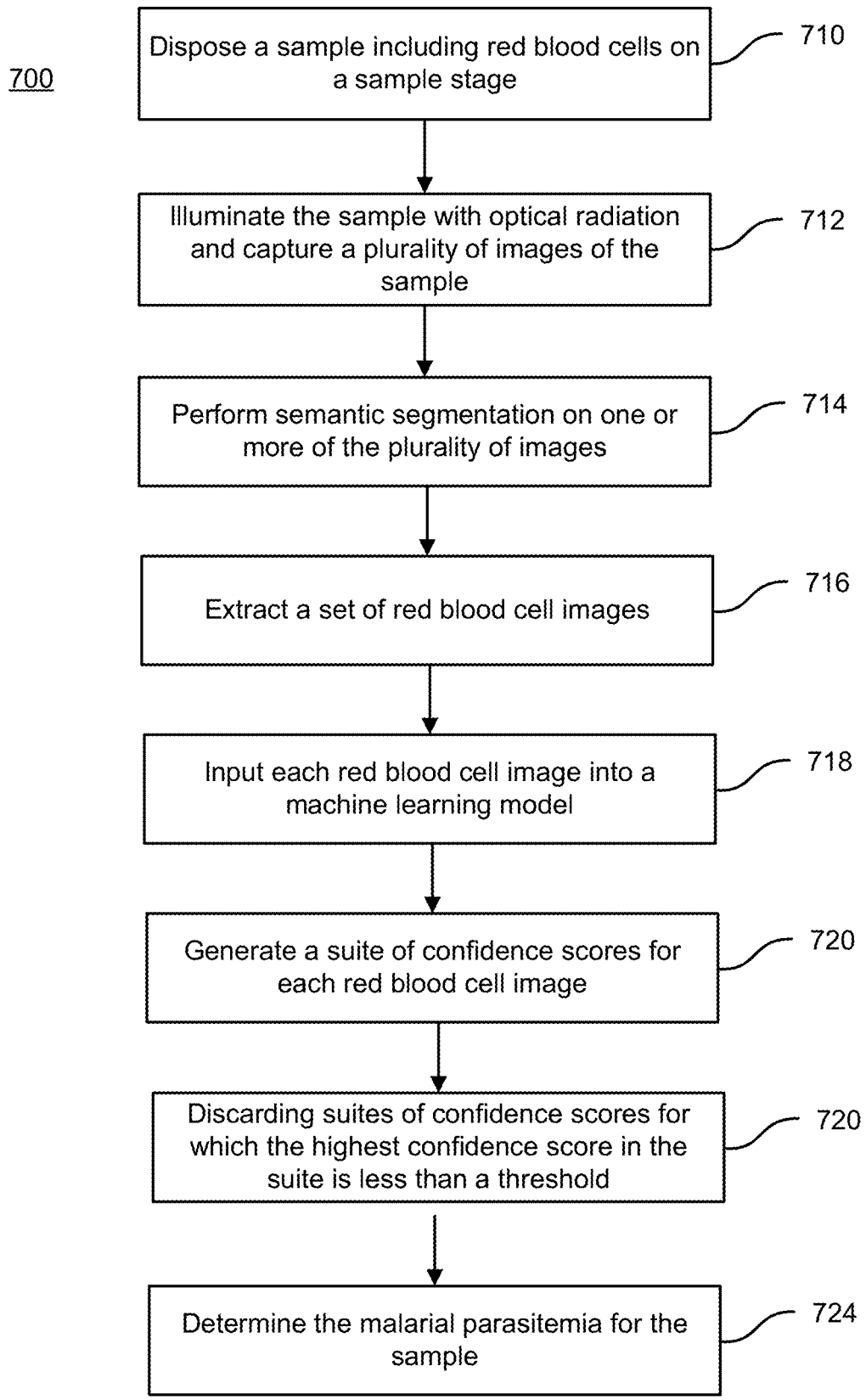
FIG. 7 is a simplified flowchart illustrating a method of measuring malaria parasitemia using thresholding according to an embodiment of the present invention.

FIG. 7 is a simplified flowchart illustrating a method of measuring malaria parasitemia using thresholding according to an embodiment of the present invention. The method 700 includes disposing a sample including red blood cells on a sample stage (710), which can be a flow cell through which the sample, which can include live cells, flows during measurement. Thus, the sample can be in liquid form and not fixed during measurement. Moreover, the sample can be free of Giemsa staining in contrast with conventional microscopy methods. The method also includes illuminating the sample with optical radiation and capturing a plurality of images of the sample (712). The optical radiation, which can be generated using a light emitting diode (LED) can include light in the ultraviolet light wavelength range or light in the visible range, for example, light produced by a violet LED operating at 405 nm. Each image of the plurality of images can be associated with a different focal plane.

The method further includes performing semantic segmentation on one or more of the plurality of images (714) and extracting, from the one or more of the plurality of images, a set of red blood cell images (716). Each red blood cell image is associated with a particular red blood cell.

For each red blood cell image in the set of red blood cell images, the method includes inputting each red blood cell image into a machine learning model and generating, using the machine learning model, a suite of confidence scores. The red blood cell images are also referred to as filtered images in this disclosure. Each of the confidence scores in the suite of confidence scores defines a probability that the particular red blood cell is associated with one of a plurality of malaria parasite lifecycle stages. In the embodiments described herein, the suite of confidence scores can include a first confidence score associated with a malaria-free red blood cell, a second confidence score associated with a ring-stage parasite, a third confidence score associated with a trophozoite-stage parasite, and a fourth confidence score associated with a schizont-stage parasite.

The method also includes use of a thresholding technique in which the method includes determining that a highest confidence score in a particular suite of confidence scores is less than a threshold and discarding that particular suite of confidence scores (720). Thus, only suites of confidence scores for which the highest confidence score exceeds the threshold will be utilized in determining the malarial parasitemia for the sample. As an example, referring to FIG. 6D, if the highest confidence score in a suite of confidence scores is the second confidence score, but this highest confidence score is less than the median of 74.9%, this suite of confidence scores will be discarded. In some embodiments, different thresholds are applied to different confidence scores, with, for example, the threshold for the second confidence score associated with ring-stage parasites being lower than the threshold for the third confidence score associated with trophozoite-stage parasites. In some embodiments, the classifier confidence threshold can be maintained at a constant value, modified in response to the results of the thresholding process, or the like.

Based on the remaining suites of confidence scores after the suites for which the highest confidence score was less than the threshold are discarded, the method includes determining the malarial parasitemia for the sample (424) by identifying cells that are parasitemic as those for which the highest confidence score is the second, third, or fourth confidence score in the particular suite of confidence scores. The malarial parasitemia can be categorized as an early stage parasitemia associated with a ring-stage parasite or a late-stage parasitemia associated with a trophozoite-stage or a schizont-stage parasite.

In some embodiments, cells for which the third confidence score is the highest confidence score in the suite of confidence scores for the cell or the fourth confidence score is the highest confidence score in the suite of confidence scores for the cell can be summed in order to determine that the malarial parasitemia is a late-stage parasitemia. An overall parasitemia can be computed by dividing the number of cells that are parasitemic by the total number of cells, with the number of cells that are parasitemic defined by the sum of the cells for which the second confidence score, the third confidence score, or the fourth confidence score is the highest confidence score in the suite of confidence scores for the cell.

It should be appreciated that the specific steps illustrated in FIG. 7 provide a particular method of measuring malaria parasitemia using thresholding according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Using thresholding of the raw data as illustrated in FIGS. 6A-6I and 7, the accuracy of the classifier was improved as shown in Table 1.

TABLE 1

| Classifier Type | Raw Accuracy (%) | Thresholded Accuracy (%) |
|---|---|---|
| Four Categories | 98.1 | 98.6 |
| Three Categories | 98.5 | 99.1 |
| Two Categories | 98.9 | 99.5 |

In order to ensure that images with the overall best focus were obtained, some embodiments of the present invention can acquire a complete focus stack at multiple wavelengths. Utilizing these complete focus stacks, it is possible to re-align the separate color channels (i.e., different wavelengths) along the z-axis for direct comparison. Additionally, the optimal focus for any one parasite does not, in general, coincide with the global best focus of the whole image field of view. Therefore, focal stacks are utilized to provide an opportunity to improve classifier robustness by capturing a range of potential positions over which parasite features can be used for classification.

Figure 8A:
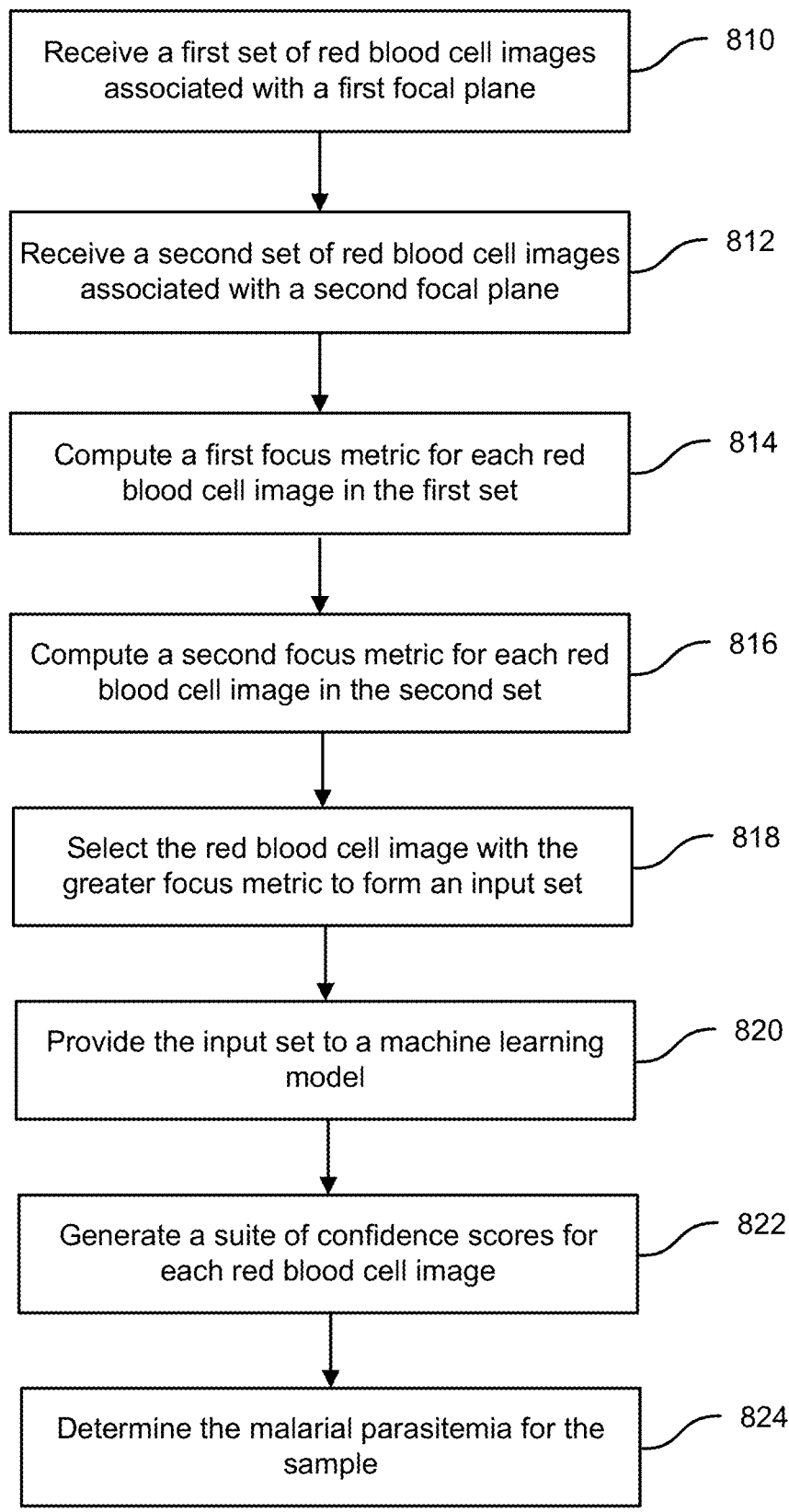
FIG. 8A is a simplified flowchart illustrating a method of measuring malaria parasitemia using slice consensus according to an embodiment of the present invention.

FIG. 8A is a simplified flowchart illustrating a method of classifying malaria parasitemia using focal information according to an embodiment of the present invention. Referring to FIG. 8A, a method 800 of measuring malarial parasitemia in a sample is provided. The method includes receiving a first set of red blood cell images associated with a first focal plane (810). Each red blood cell image in the first set of red blood cell images is associated with one of the red blood cells present in the sample. The method also includes receiving a second set of red blood cell images associated with a second focal plane. Each red blood cell image in the second set of red blood cell images is also associated with one of the red blood cells in the sample. Accordingly, for a particular red blood cell, an image of that particular red blood cell at a first focal plane will be present in the first set of red blood cell images and another image of that particular red blood cell at the second focal plane will be present in the second set of red blood cell images. As illustrated in FIG. 2C, which can be considered as a first set of red blood cell images, red blood cell 238 includes a schizont-stage parasite. Another image of red blood cell 238 will be present in the second set of red blood cell images. Accordingly, each set of red blood cell images will include one image for each red blood cell in the sample, with each red blood cell in the sample being imaged at different focal planes in each set of red blood cell images.

As discussed above, multiple focal planes can be utilized in capturing the images used to generate inputs for the machine learning model and in this embodiment only two focal planes are discussed for purposes of clarity, but it will be appreciated that embodiments of the present invention are not limited to two focal planes and additional focal planes can be utilized as appropriate to the particular application. In some embodiments, five focal planes are utilized in this method based on the use of focal information.

Receiving the first set of red blood cell images can include disposing a sample including red blood cells on a sample stage, illuminating the sample with optical radiation, capturing a first image of the sample at the first focal plane, and performing semantic segmentation on the first image. Given the semantic segmentation, the method can also include extracting, from the first image, the first set of red blood cell images. Accordingly, a first set of red blood cell images with the sample disposed in the first focal plane is acquired.

Receiving the second set of red blood cell images can include disposing the sample including the red blood cells on the sample stage, illuminating the sample with optical radiation, capturing a second image of the sample at a second focal plane, and applying the segmentation mask defined by semantic segmentation of the first image. Given the semantic segmentation, the method can also include extracting, from the second image, the second set of red blood cell images. Accordingly, a second set of red blood cell images with the sample disposed in the second focal plane is acquired.

The method 800 also includes computing a first focus metric for each red blood cell image in the first set of red blood cell images (814) and computing a second focus metric for each red blood cell image in the second set of red blood cell images (816). Given these focus metrics, an input set of red blood cell images is formed by selecting, using each red blood cell image in the first set of red blood cell images and each red blood cell image in the second set of red blood cell images, the red blood cell image with the greater focus metric (818).

Since each red blood cell image in the first set and each red blood cell image in the second set is associated with a particular red blood cell in the sample, the input set of red blood cell images used by the machine learning model is formed by selecting, for each particular red blood cell, the red blood cell image from either the first set or the second set that has the greater focus metric. In this way, the input set includes, for each particular red blood cell in the sample, the red blood cell image that is in the best focus. It is not required that all of the red blood cell images in the input set are drawn from a single focal plane, but in fact, the inputs set may include a red blood cell image for a particular red blood cell obtained at one focal plane and a red blood cell image for another particular red blood cell obtained at a different focal plane. As a result, the input set includes, for each particular red blood cell, the corresponding red blood cell image that is in best focus.

Given the input set of red blood cell images, the method further includes, for each red blood cell image in the input set of red blood cell images, inputting each red blood cell image into a machine learning model (820), and generating, using the machine learning model, a suite of confidence scores for each red blood cell image (822). Each of the confidence scores in the suite of confidence scores defines a probability that the particular red blood cell is associated with one of a plurality of malaria parasite lifecycle stages. Additionally, the method includes determining the malarial parasitemia for the sample (824).

It should be appreciated that the specific steps illustrated in FIG. 8A provide a particular method of classifying malaria parasitemia using focal information according to an embodiment of the present invention. Other sequences of steps may also be performed according to alternative embodiments. For example, alternative embodiments of the present invention may perform the steps outlined above in a different order. Moreover, the individual steps illustrated in FIG. 8A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8B:
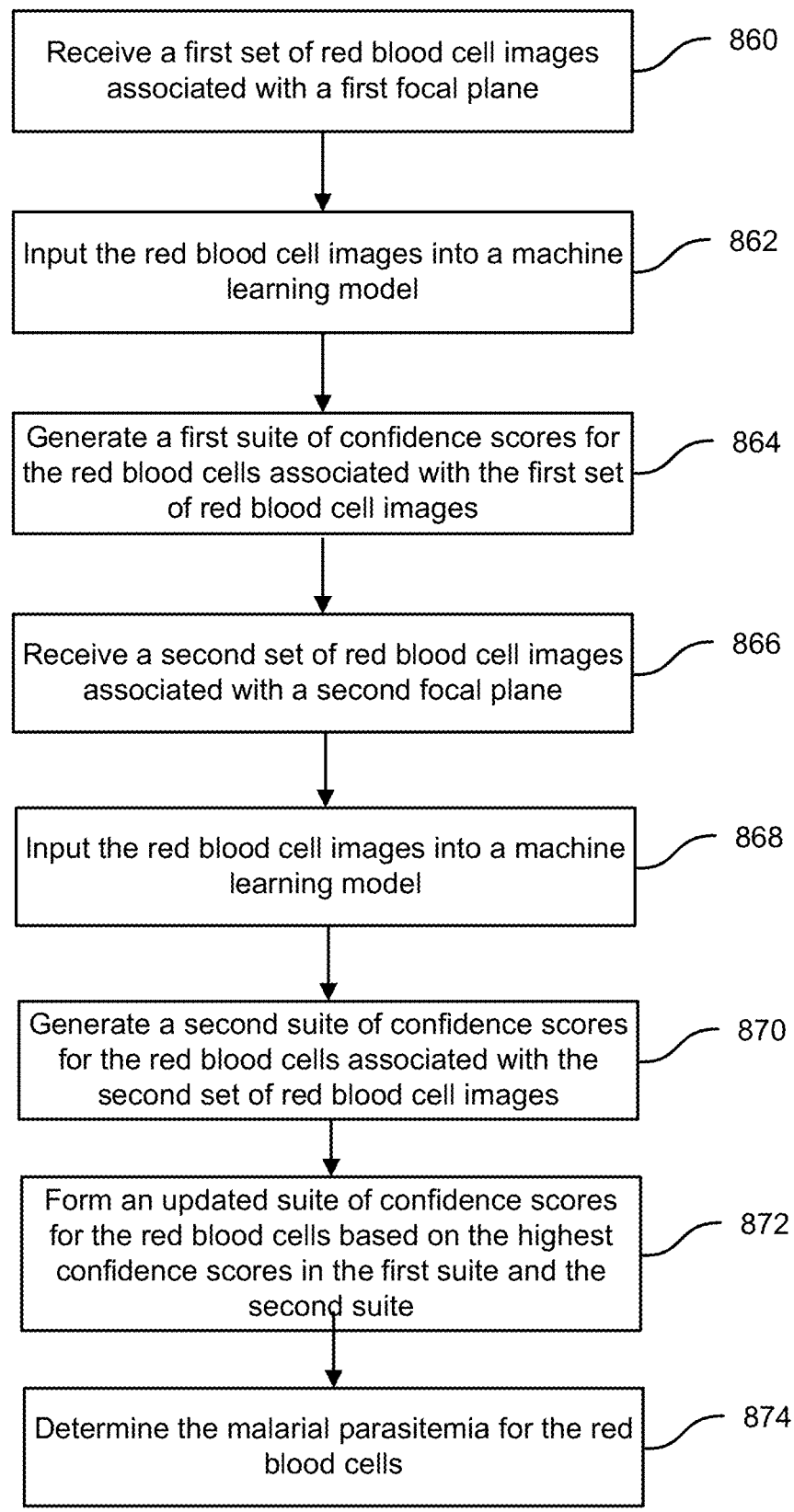
FIG. 8B is a simplified flowchart illustrating a method of classifying malaria parasitemia using focal information according to another embodiment of the present invention.

FIG. 8B is a simplified flowchart illustrating a method of classifying malaria parasitemia using focal information according to another embodiment of the present invention. The inventors have determined that due to variable parasite contrast with focus, the robustness of scoring parasites could be improved by consideration of all the focal slices available for each red blood cell instance. Thus, as illustrated in FIG. 8A, focal information was utilized by employing a maximum confidence voting strategy on a cell-by-cell basis to select the best red blood cell image among the available red blood cell images associated with a particular red blood cell and this best red blood cell image was used as the input for machine learning prediction. In the method illustrated in FIG. 8B, each focal slice of a given red blood cell is processed independently, and the slice with the highest classification confidence is used in assembling the predicted classifications.

Referring to FIG. 8B, a method 850 of measuring malarial parasitemia in a sample including red blood cells is provided. The method includes receiving a first set of red blood cell images (860). The first set of red blood cell images is associated with a first focal plane. Each red blood cell image in the first set of red blood cell images is associated with a particular red blood cell. The method also includes, for each red blood cell image in the first set of red blood cell images, inputting each red blood cell image into a machine learning model (862) and generating, using the machine learning model, a first suite of confidence scores for each red blood cell (864). Each of the confidence scores in the first suite of confidence scores defines a probability that the particular red blood cell is associated with one of a plurality of malaria parasite lifecycle stages. Thus, for the first set of red blood cell images, a suite of confidence scores is generated for each red blood cell indicating the predicted classifications for each of the particular red blood cells.

The method also includes receiving a second set of red blood cell images (866). The second set of red blood cell images are associated with a second focal plane. Each red blood cell image in the second set of red blood cell images is associated with the particular red blood cell with which each red blood cell image in the first set of red blood cell images was associated. For each red blood cell image in the second set of red blood cell images, the method includes inputting each red blood cell image into the machine learning model (868) and generating, using the machine learning model, a second suite of confidence scores for each red blood cell (870). Each of the confidence scores in the second suite of confidence scores defines a probability that the particular red blood cell is associated with one of the plurality of malaria parasite lifecycle stages. Thus, for the second set of red blood cell images, a suite of confidence scores for each red blood cell is generated indicating the predicted classifications for each of the particular red blood cells.

In order to utilize the highest confidence scores in the determining the malarial parasitemia, the method includes forming an updated suite of confidence scores for each red blood cell by selecting, from the first suite of confidence scores and the second suite of confidence scores, a highest confidence score associated with each particular red blood cell (872). As an example, for a particular red blood cell, an image in the first set will have been used to generate a first suite of confidence scores and an image in the second set, associated with a different focal plane, will have been used to generate a second suite of confidence scores. The suite including the highest confidence score of the two suites will be selected for inclusion in the updated suite of confidence scores. This process will be repeated using images associated with the remaining particular red blood cells from both sets to complete the formation of the updated suites of confidence scores for the red blood cells in the sample. Finally, the method includes determining the malarial parasitemia for the sample using the updated suites of confidence scores.

It should be appreciated that the specific steps illustrated in FIG. 8B provide a particular method of classifying malaria parasitemia using focal information according to another embodiment of the present invention. Other sequences of steps may also be performed according to alternative embodiments. For example, alternative embodiments of the present invention may perform the steps outlined above in a different order. Moreover, the individual steps illustrated in FIG. 8B may include multiple sub-steps that may be performed in various sequences as appropriate to the individual step. Furthermore, additional steps may be added or removed depending on the particular applications. One of ordinary skill in the art would recognize many variations, modifications, and alternatives.

Using a slice consensus method as illustrated in FIG. 8B, the accuracy of the classifier was improved as shown in Table 2 by an embodiment of the method.

TABLE 2

| Classifier Type | Raw Accuracy (%) | Maximum Slice Confidence Accuracy (%) |
|---|---|---|
| Four Categories | 98.1 | 99.1 |
| Three Categories | 98.5 | 99.2 |
| Two Categories | 98.9 | 99.4 |

Thus, in FIG. 8B, each focal slice of a given red blood cell was processed independently, and only the slice with the highest classification confidence was used. The inventors have determined that this selection method is more robust across nearly all performance metrics, often resulting in a better result than achieved through the use images collected at any one individual focal plane. In the four-category classifier, overall accuracy improved from to 98.1% to 99.1%, while the false-positive rate for rings (healthy cells identified as having ring-stage parasites) decreased from 0.7% to 0.35%.

Figure 9A:
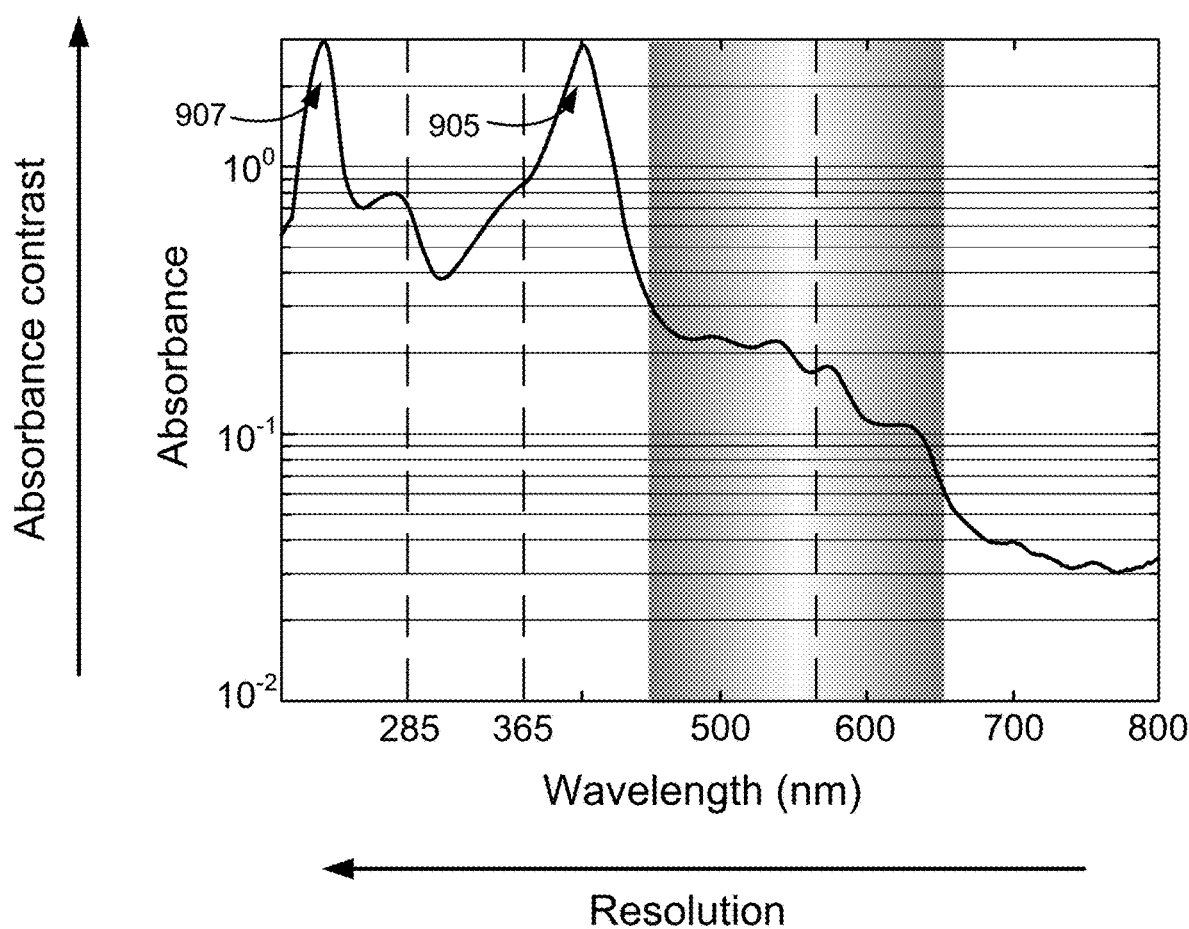
FIG. 9A is a plot illustrating hemoglobin optical absorbance as a function of wavelength.

FIG. 9A is a plot illustrating hemoglobin optical absorbance as a function of wavelength. As illustrated in FIG. 9, the hemoglobin optical absorbance varies by several orders of magnitude over the UV and visible range. As the wavelength of light used for imaging decreases, the resolution improves as will be evident to one of skill in the art. Accordingly, embodiments of the present invention can utilize wavelengths in the visible portion of the optical spectrum as well as UV wavelengths. The inventors have also determined that as the absorbance increases, the absorption contrast, which is correlated with the presence of parasites in the red blood cells since hemoglobin is the dominant protein and chromophore in the red blood cell, increases, improving image quality. In particular, peak 905 exists in the hemoglobin optical absorbance spectrum at 405 nm and peak 907 exists in the hemoglobin optical absorbance spectrum below 285 nm. Accordingly, some embodiments utilize 405 nm radiation to achieve a maximum contrast, which improves the ability to detect the malarial parasites. As described more fully in relation to FIG. 11A, use of 405 nm radiation enables the use of commercially available laser or LED sources and low cost optical elements (e.g., non-quartz lenses), thereby reducing system cost and enabling widespread availability of implementations of the present invention.

Figure 9B:
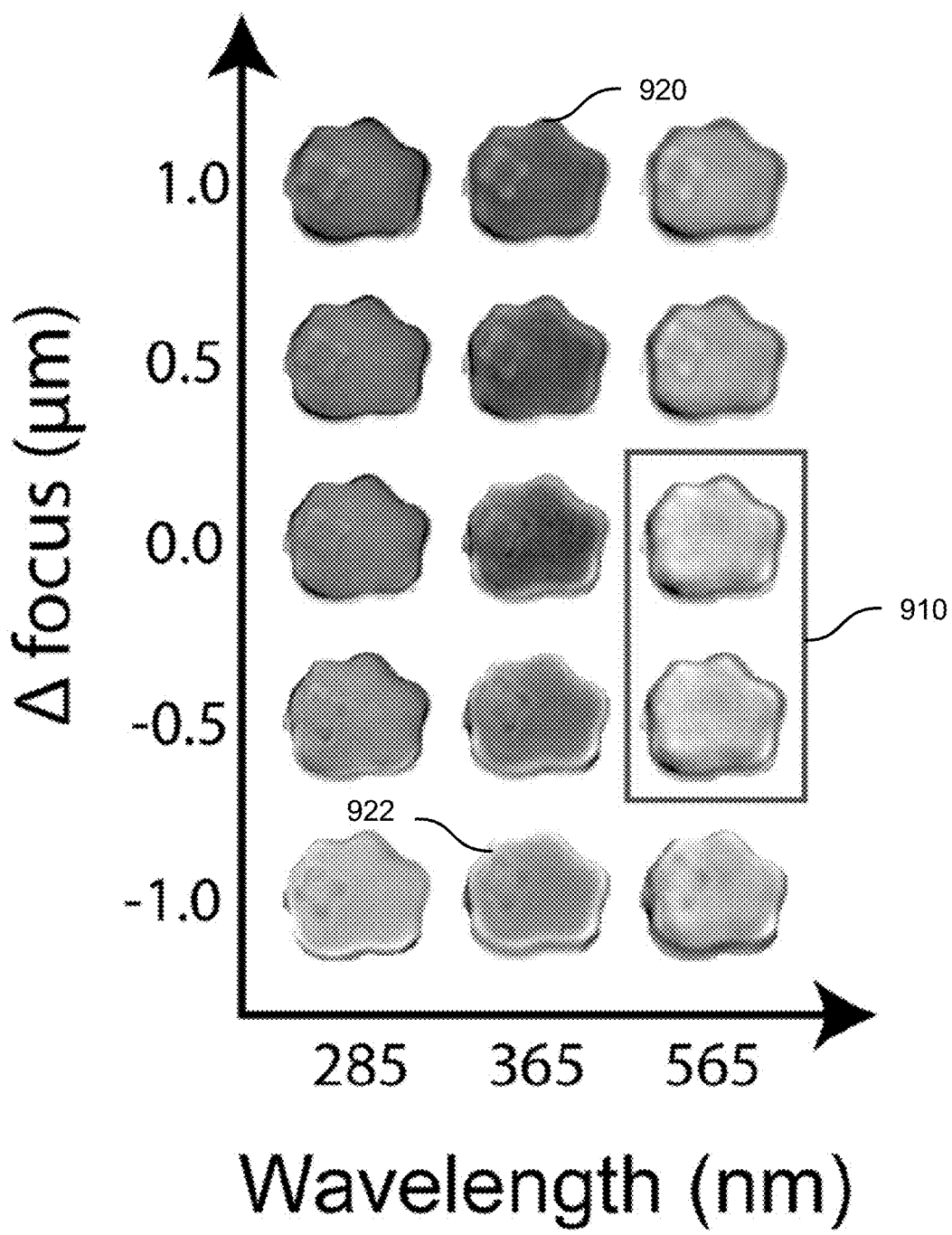
FIG. 9B is a set of red blood cell images displayed as a function of imaging wavelength and focal plane according to an embodiment of the present invention.

FIG. 9B is a set of red blood cell images displayed as a function of imaging wavelength and focal plane according to an embodiment of the present invention. The red blood cell images illustrated in FIG. 9B are all different images of a single red blood cell having a ring-stage parasite. The array of red blood cell images illustrated in FIG. 9 was obtained using the multi-wavelength microscope with an integrated flow cell illustrated in FIG. 1. In order to investigate the impact of the spectral characteristics of the hemoglobin optical absorbance spectrum that are illustrated in FIG. 9A, red blood cell images were obtained using optical radiation at 285 nm, 365 nm, and 565 nm. As illustrated in FIG. 9B, in addition to imaging the single red blood cell using different wavelengths, images were obtained at different focal planes, illustrated by the change in focus along the optical axis (i.e., the z-axis in FIG. 1) with respect to a center position, i.e., red blood cell images obtained at 1 µm from the center position, 0.5 µm from the center position, the center position, −0.5 µm from the center position, and −1 µm from the center position. Accordingly, in FIG. 9B, a red blood cell image array including 15 images of the single red blood cell is illustrated that was obtained over a range of wavelengths and focal planes.

Considering the array of red blood cell images shown in FIG. 9B, the inventors have determined that the absorption contrast, which depends on the molecular absorption of the parasite, and the phase contrast, which depends on the refractive index of the parasite, are competing factors impacting the classification efficiency. Examining the array of images of the same ring-stage infected red blood cell in this multi-dimensional image space, an assessment of classifier performance as a function of wavelength and focal offset can be performed. For most of the images in the image array, the ring-stage parasite is identifiable. However, as discussed below, the parasite becomes difficult to observe in the two focus slices in box 910, which were the red blood cell images obtained using 565 nm light with the sample positioned at the center position and at a position −0.5 μm from the center position.

As the focal plane is adjusted, the parasites observed in the red blood cell images tend to shift from bright to dark in terms of contrast in terms of the background provided by the red blood cell. This effect is illustrated by red blood cell image 920, obtained using 365 nm light with the sample positioned at a position 1.0 μm from the center position, which includes a bright parasite, and red blood cell image 922, obtained using 365 nm light with the sample positioned at a position −1.0 μm from the center position, which includes a dark parasite. Thus, as the focal plane is shifted, the phase contrast in the image of the parasite experiences an inversion through the focus. As a result, at the point of inversion, the parasite blends into the background and can effectively disappear as a result of this variation in phase contrast as a function of the focal plane. In other words, the parasite can vanish entirely at certain focal planes due to the phase component exactly cancelling the absorptive component of the image.

However, the inventors have determined that if the absorption contrast is sufficiently high, the parasite can be visible, even at the focal plane associated with the inversion in the phase contrast. Considering box 910 and imaging using visible light at 565 nm, the parasite effectively disappears at the two illustrated focal planes. Accordingly, embodiments of the present invention utilize wavelengths that provide high absorption contrast, which enables the membrane boundary of the parasite to be observed and prevents the inversion of the phase contrast that occurs as a function of focal plane, from causing the parasite to blend into the background.

The inventors have determined that short wavelengths, including violet and UV wavelengths, which provide both higher resolution and higher molecular absorbance by hemoglobin can be utilized for robust label-free imaging of *Plasmodium falciparum* because a) the membrane is sharply resolved (i.e., higher resolution) and b) there are no focal planes for which the parasite's cytoplasm fully vanishes by contrast cancellation (i.e., absorption contrast exceeds the maximum phase contrast).

Figure 9C:
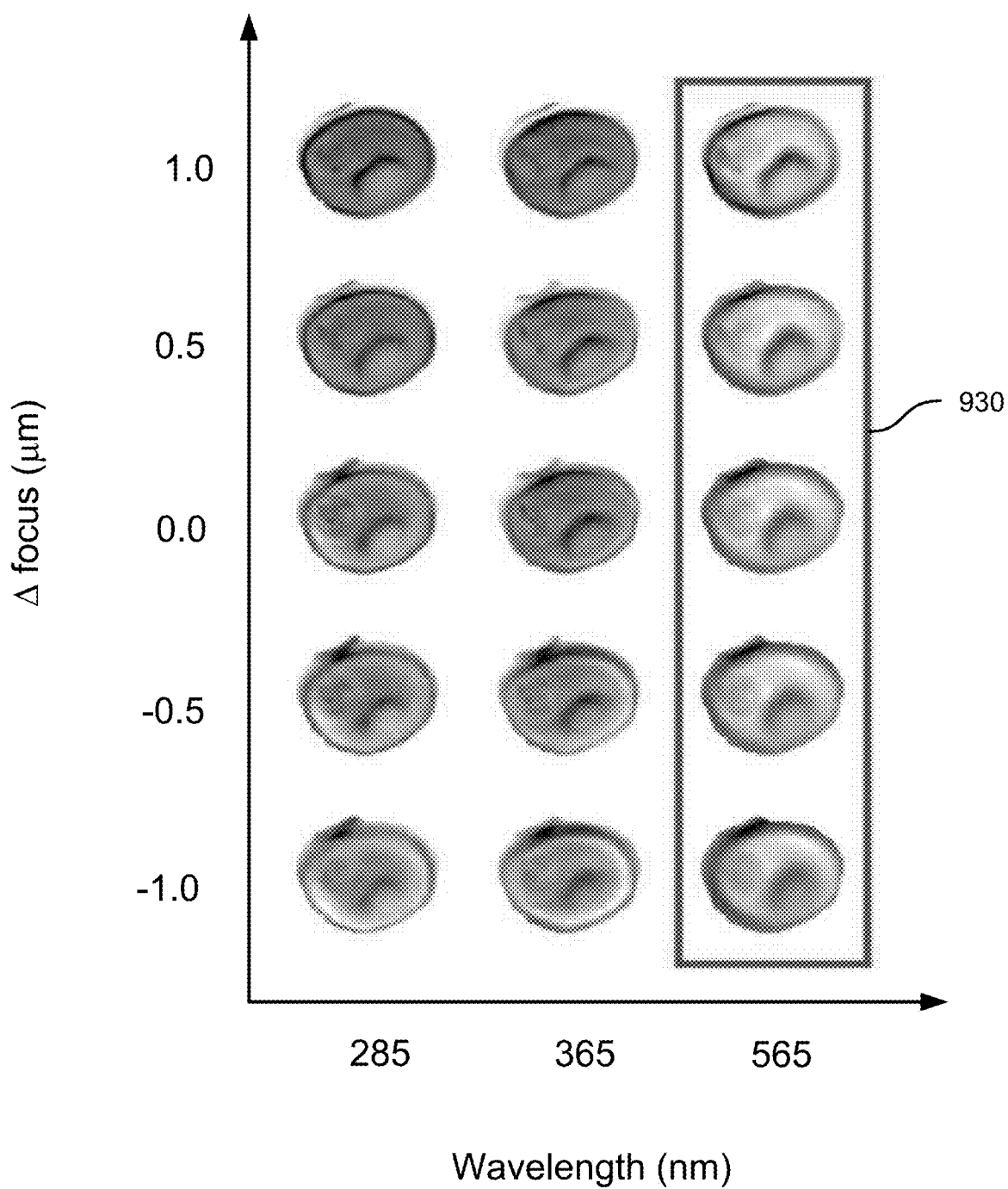
FIG. 9C is a set of images of red blood cells having ring-stage malaria parasites captured at various focus positions and at various wavelengths according to an embodiment of the present invention.

FIG. 9C is a set of images of red blood cells having ring-stage malaria parasites captured at various focus positions and at various wavelengths according to an embodiment of the present invention. Similar to FIG. 9B, FIG. 9C illustrates a set of red blood cell images that are different images of a single red blood cell having a ring-stage parasite. As illustrated in FIG. 9C, in addition to imaging the single red blood cell using different wavelengths, images were obtained at different focal planes, illustrated by the change in focus along the optical axis (i.e., the z-axis in FIG. 1) with respect to a center position. Accordingly, in FIG. 9C, a red blood cell image array including 15 images of the single red blood cell is illustrated that was obtained over a range of wavelengths and focal planes.

Considering the array of red blood cell images shown in FIG. 9C, and in a manner similar to that discussed in relation to FIG. 9B, the parasite becomes difficult to observe, despite the focal plane utilized, for red blood cell images obtained using 565 nm light, as demonstrated by the red blood cell images contained in box 930. At this wavelength in the visible spectrum, the absorption contrast is sufficiently low that the parasite is not clearly visible at any of the focal planes utilized for imaging. Accordingly, as discussed above, embodiments of the present invention utilize wavelengths that provide high absorption contrast, which enables the membrane boundary of the parasite to be observed and prevents the inversion of the phase contrast that occurs as a function of focal plane from causing the parasite to blend into the background.

It should be noted that in some embodiments, in addition to obtaining confidence scores for red blood cells located at different focal planes, confidence scores can be obtained at different wavelengths and the classification process can utilize the wavelength resulting in the highest confidence score. Thus, in addition to the use of confidence scores arrayed across focal planes, confidence scores arrayed across wavelengths can be utilized either alone or in combination. Additionally, the sample can be illuminated with multiple wavelengths concurrently, providing the ability to obtain images and perform classification at different wavelengths concurrently or simultaneously. One of ordinary skill in the art would recognize many variations, modifications, and alternatives.

Figure 10A:
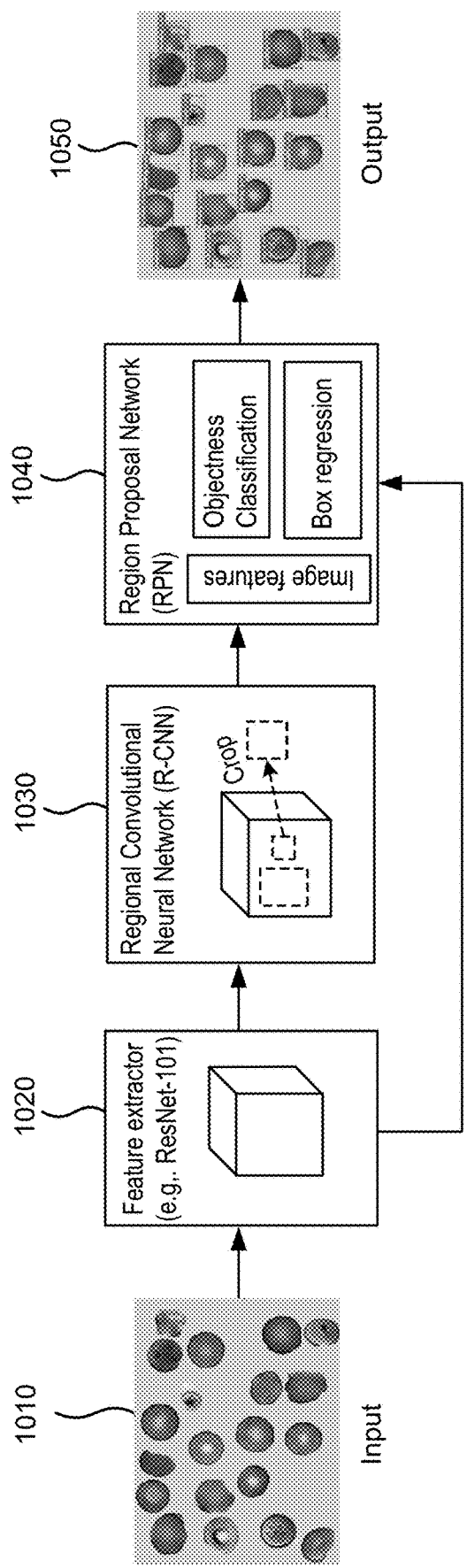
FIG. 10A is a schematic diagram illustrating a R-CNN system according to an embodiment of the present invention.

FIG. 10A is a schematic diagram illustrating a Regional Convolutional Neural Network (R-CNN) system according to an embodiment of the present invention. Referring to FIG. 10A, a python-based R-CNN model was utilized to categorize both healthy and parasitized red blood cells utilizing images including red blood cells, also referred to as raw images. Thus, in the embodiment illustrated in FIG. 10A, the semantic segmentation step utilized to extract red blood cell images from the raw image, e.g., image 1010, prior to classification, is not utilized. The R-CNN system illustrated in FIG. 10A provides several advantages, including that the direct detection on raw images is simpler to implement, with fewer intermediate steps since the semantic segmentation process can be removed. Second, the python-based framework is more easily open-sourced and disseminated. Finally, this method has a more direct path for implementation on a low-cost, embedded system.

Referring to FIG. 10A, in the illustrated embodiment, an input image such as image 1010 is received and a feature extractor 1020, illustrated by ResNet-101 1020, is employed in order to extract high-level features from image 1010. The output of the feature extractor 1020 is then sent to RPN 1040, which uses these features to create object proposals by regressing to the ground-truth bounding boxes. Additionally, the output is sent to R-CNN 1030, which uses the bounding box coordinates to extract a subset of the high-level features for the region from the final layer of the base network (i.e., ResNet-101 1020). R-CNN 1030 reshapes these subset features and passes them to a classifier with fully connected layers, implemented in FIG. 10A as RPN 1040, to classify the objects and output the class and the bounding box of each detected object as illustrated by output 1050. Thus, in addition to the semantic segmentation processes discussed in relation to FIG. 4B, red blood cell detection using bounding boxes or other appropriate image processing techniques are included within the scope of the present invention to provide the red blood cell images that can be utilized by the machine learning network. It should be noted that embodiments of the present invention are not limited to the particular machine learning system illustrated in FIG. 10A, which is merely illustrated as an exemplary embodiment. Thus, for example, although feature extractor 1020 is illustrated as ResNet-101 and R-CNN 1030 and RPN 1040 are shown in FIG. 10A, this particular implementation of a machine learning system is not required by embodiments of the present invention and other suitable machine learning systems can be utilized and are included within the scope of the present invention. In particular, machine learning systems that are optimized for mobile processors and low cost embedded computing hardware can be utilized in accordance with the methods and systems described herein.

Figure 10B:
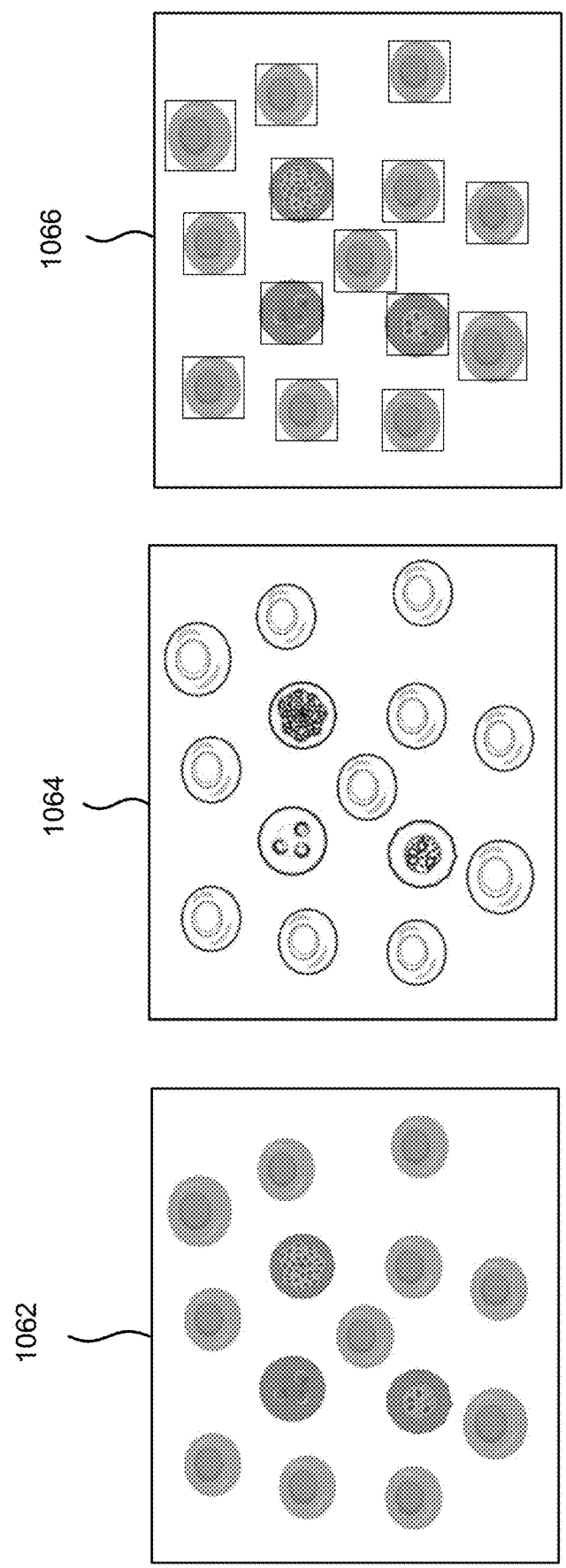
FIG. 10B is a set of images produced at various stages of the (R-CNN) system illustrated in FIG. 10A according to an embodiment of the present invention.

FIG. 10B is a set of images produced at various stages of the (R-CNN) system illustrated in FIG. 10A according to an embodiment of the present invention. As illustrated in FIG. 10B, input image 1062 is received by feature extractor 1020 (e.g., ResNet-101) illustrated in FIG. 10A. Feature extraction is performed to produce high-level features from input image 1062, resulting in the features illustrated in feature image 1064. After processing using R-CNN 1030 and RPN 1040 as illustrated in FIG. 10A, a set of detected red blood cells are produced as illustrated in detected cell image 1066. Thus, in some embodiments, single shot detection is enabled using an input image including a plurality of red blood cells.

FIG. 11 is a confusion matrix corresponding to the R-CNN system illustrated in FIG. 10A. As illustrated in FIG. 11, the R-CNN system illustrated in FIG. 10A performed exceptionally well for the four illustrated categories. Overall accuracy was 99.2%, which was better than techniques utilizing slice consensus as discussed in relation to FIG. 8B. It should be noted that for rings, which is the most common stage in peripheral blood, the false positive rate was 0.2%, with approximately 95% precision and recall. For trophozoites and schizonts the false positive rate was negligible, and precision and recall near 90%.

Figure 12A:
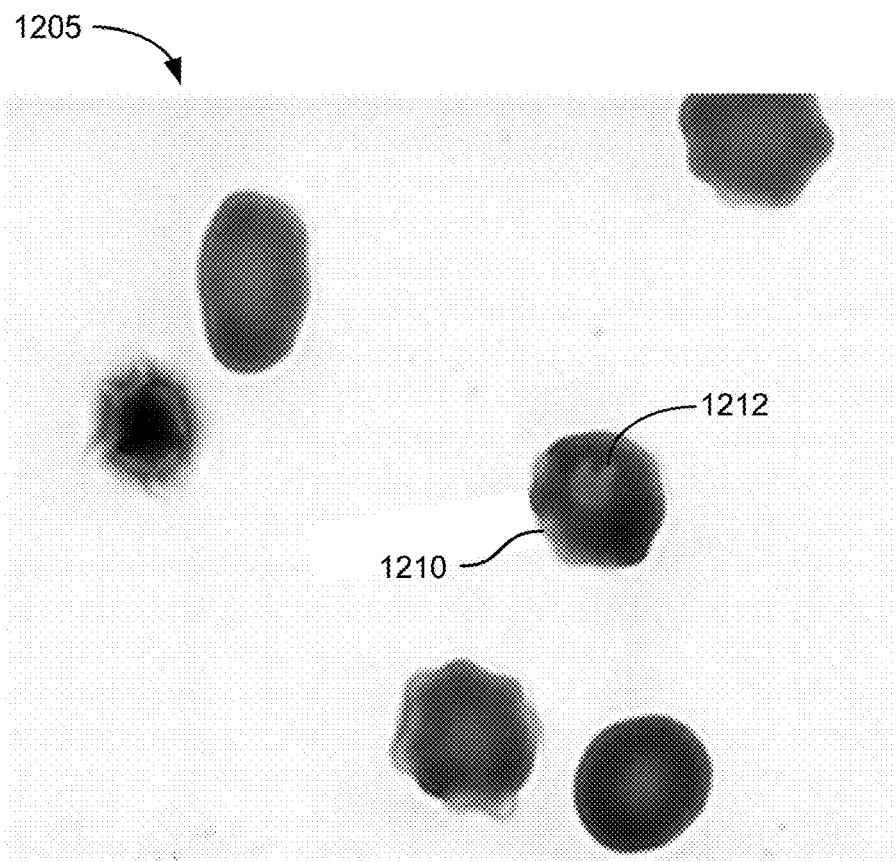
FIG. 12A is an image of red blood cells captured using the single wavelength microscope illustrated in FIG. 11A according to an embodiment of the present invention.

FIG. 12A is an image of red blood cells captured using the single wavelength microscope illustrated in FIG. 11A according to an embodiment of the present invention. As illustrated in FIG. 12A, image 1205 includes red blood cell image 1210 obtained using 405 nm illumination light. In this red blood cell image, parasite 1212 appears as a light object on a dark background. Because parasite 1212 is an early-stage parasite, it has not yet accumulated a significant amount of hemoglobin. As a result of the low hemoglobin concentration in the parasite compared to the higher hemoglobin concentration in the remainder of the red blood cell, the presence of parasite 1212 is observed as a light object on a dark background.

Referring back to the discussion provided in relation to FIGS. 9B and 9C, illumination of the sample using 405 nm light provides such high levels of absorption contrast that the inversion in the phase contrast, which can be present in the image of the parasite at visible wavelengths, as the focal plane is changed and moves through the focus is prevented in many cases. Thus, in contrast with illumination wavelengths at which the parasite blends into the background and can effectively disappear as a result of the phase contrast inversion, the use of 405 nm and other high absorption contrast wavelengths, enables the parasite to be visible at most or all focal planes.

Figure 12B:
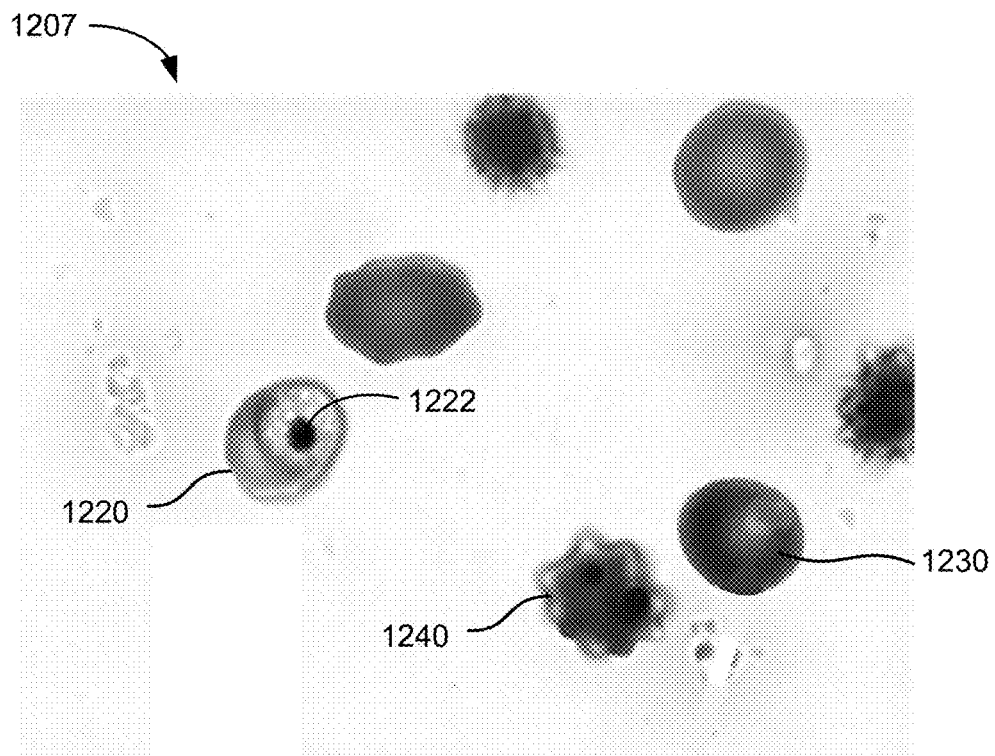
FIG. 12B is another image of red blood cells captured using the single wavelength microscope illustrated in FIG. 11A according to an embodiment of the present invention.

FIG. 12B is another image of red blood cells captured using the single wavelength microscope illustrated in FIG. 11A according to an embodiment of the present invention. As illustrated in FIG. 12B, image 1207 was also obtained at 405 nm and includes a number of red blood cell images, including red blood cell images 1220, 1230, and 1240. Red blood cell image 1220 includes a schizont-stage parasite 1222. In this red blood cell image, schizont-stage parasite 1222 appears as an object containing a light but textured periphery composed of nascent merozoites, and a dark central region comprised of crystallized hemozoin. Because schizont-stage parasite 1222 is a late-stage parasite, it has consumed a significant amount of hemoglobin, resulting in a central hemozoin crystal that has depleted the level of hemoglobin in the remainder of the red blood cell. As a result of the presence of the hemozoin and the low hemoglobin concentration in the remainder of the red blood cell due to pigment redistribution, the presence of schizont-stage parasite 1222 is observed as a light annulus with a dark center. Red blood cell image 1230 is similar to red blood cell image 1210, indicating the presence of an early-stage parasite. Thus, multiple parasite life stages are recognized in image 1207.

Figure 13:
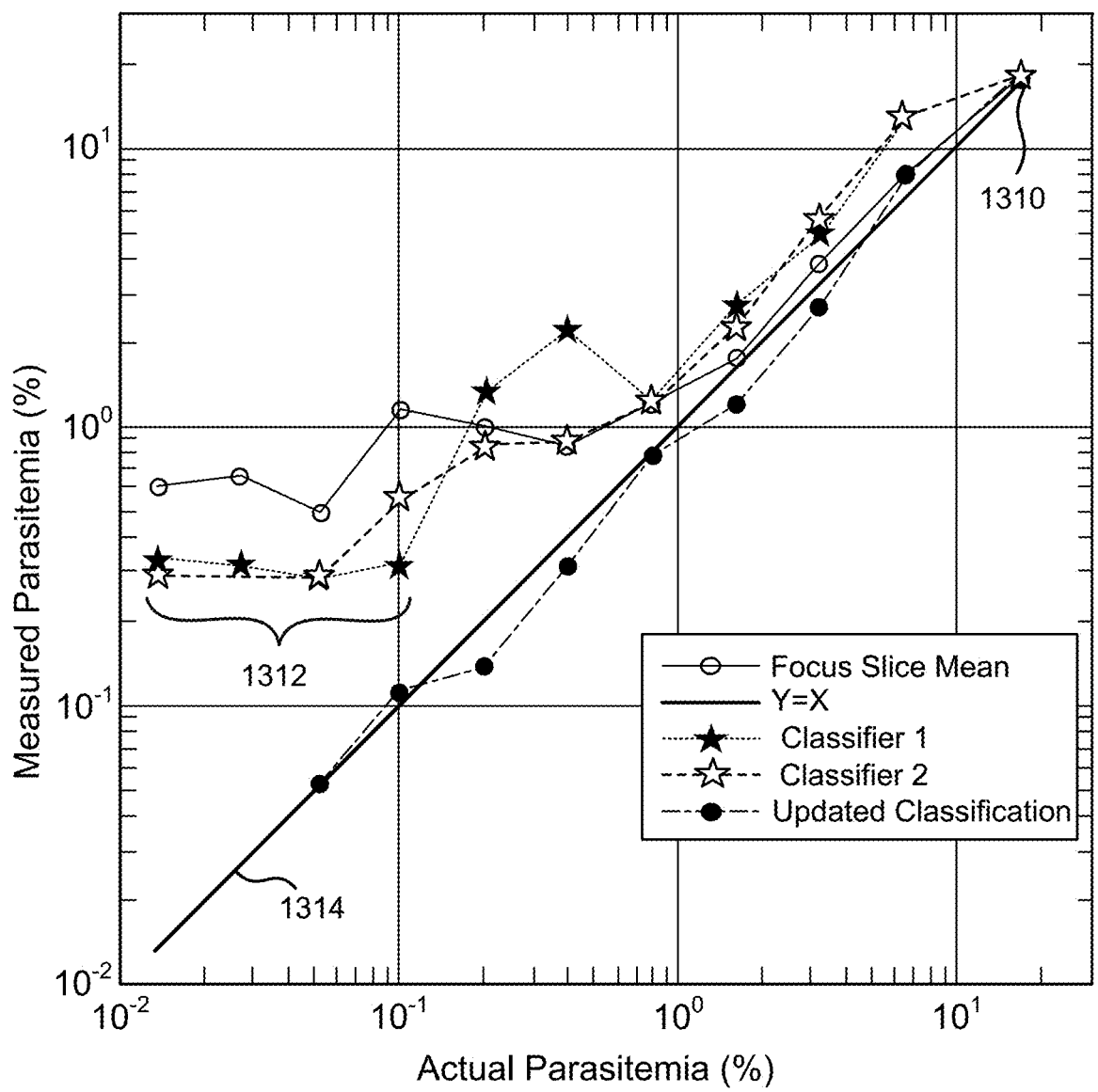
FIG. 13 is a plot of measured parasitemia as a function of nominal parasitemia for several measurement methods according to an embodiment of the present invention.

FIG. 13 is a plot of measured parasitemia as a function of nominal parasitemia, shown as Actual Parasitemia in FIG. 13, for several measurement methods according to an embodiment of the present invention. In order to collect the data illustrated in FIG. 13, samples with high concentrations of parasites were sequentially diluted by a factor of two to provide a set of samples varying in parasite concentration. Then, the classifier was used to determine the impact of parasite concentration on classifier confidence and classifier performance. For sample 1310, the parasite concentration exceeded 10%, whereas for samples 1312, the parasite concentration was between 0.01% and 0.1%.

Using the samples with varying parasite concentration, the multi-wavelength microscope illustrated in FIG. 1 was utilized to measure the malarial parasitemia associated with each of the samples. The Focus Slice Mean measurements were obtained by using the mean value of the confidence scores predicted using images from different focal planes. As discussed in relation to FIGS. 5A and 5B, the false positive rate for cells with ring-stage parasites of 0.6% shown in cell 512 in FIG. 5A, appears in FIG. 13 as the measured parasitemia based on the Focus Slice Mean measurement decreasing as the actual parasitemia percentage decreases, but leveling off at a measured parasitemia value of ~0.6% for samples 1312.

Classifier 1 and Classifier 2 represent parasitemia measurement results produced by two technicians who manually counted the parasitemia percentage using conventional fixation and Giemsa staining methods. Generally, Classifier 1 and Classifier 2 follow the results obtained by the Focus Slice Mean measurements, resulting in higher measurements at some parasite concentrations and lower measurements at other parasite concentrations. For samples 1312, Classifier 1 and Classifier 2 achieve a lower false positive rate (i.e., on the order of 0.3%) than that achieved by the Focus Slice Mean measurements. In all three measurement methods, as the parasite concentration decreases, the measured parasitemia percentage does not decrease as rapidly as the actual parasitemia percentage, resulting in these measurements results trending along a line above the Y=X line 1314. Thus, in all three measurement methods, the measured parasitemia percentage fails to track the actual parasitemia percentage at low parasite concentrations, but generating false positives in a range of values from ~0.6% down to ~0.3%.

In order to improve classification accuracy at these low parasite concentrations, embodiments of the present invention export a subset of red blood cell images for which the highest confidence score in the suite of confidence scores is less than a threshold. This subset of red blood cell images can then be displayed for further review and classification, for example, by a technician. As discussed in relation to FIGS. 6A, 6E, and 6I, since the median for accurately classified cells is high (>99.6%), exporting of a small number red blood cell images with low confidence scores (e.g., less than 1%) enables correct classification of these red blood cell images, thereby preventing the false positive results illustrated in FIG. 13. Thus, after displaying this subset of red blood cell images, an updated confidence score can be received for each of the red blood cell images in the subset of red blood cell images, the suite of confidence scores for each of the subset of red blood cells images can be updated using the updated confidence score, and the malarial parasitemia for the particular red blood cells can then be determined with higher accuracy. As illustrated in FIG. 13, using these updated confidence scores to provide updated suites of confidence scores, the Updated Classification method reduces the number of false positives (e.g., effectively to zero) and tracks with the actual parasitemia percentage as illustrated in FIG. 13. It should be noted that the Updated Classification method does not include data points for the two samples with the lowest parasite concentration because, for these two samples, no parasites were observed.

The inventors have determined that the Updated Classification method filters out and correctly classifies the very small number of red blood cell images for which the classifier has low confidence. In some embodiments, rather than having a technician correctly classify these red blood cell images, a second machine learning model is trained and used to perform updating of the confidence scores. Thus, although some embodiments of the present invention utilize a process in which the subset of red blood cell images are displayed, at least one updated confidence score is received, and the suite of confidence scores for each of the subset of red blood cells images is updated using the at least one updated confidence score, embodiments of the present invention are not limited to these embodiments. In other embodiments, once it has been determined that the highest confidence score in a suite is less than a threshold, the red blood cell image associated with this suite can be exported and a second machine learning model can be utilized to provide an updated suite of confidence scores and/or a parasitemia classification for the particular red blood cell associated with the red blood cell image.

During analysis of the subset of red blood cell images, the inventors have noted that as the time span that begins when the red blood cells are removed from the human body increases, cell morphology changes result in misshapen red blood cells. As an example, misshapen cells may be characterized by spike or barb shaped outer surfaces that may be referred to as echinocytes, which decrease the confidence scores generated by the machine learning model. Referring to FIG. 12B, one such cell is illustrated as red blood cell 1240. By exporting the images for these cells and updating the confidence scores, the results shown in FIG. 13 can be achieved.

Figure 14:
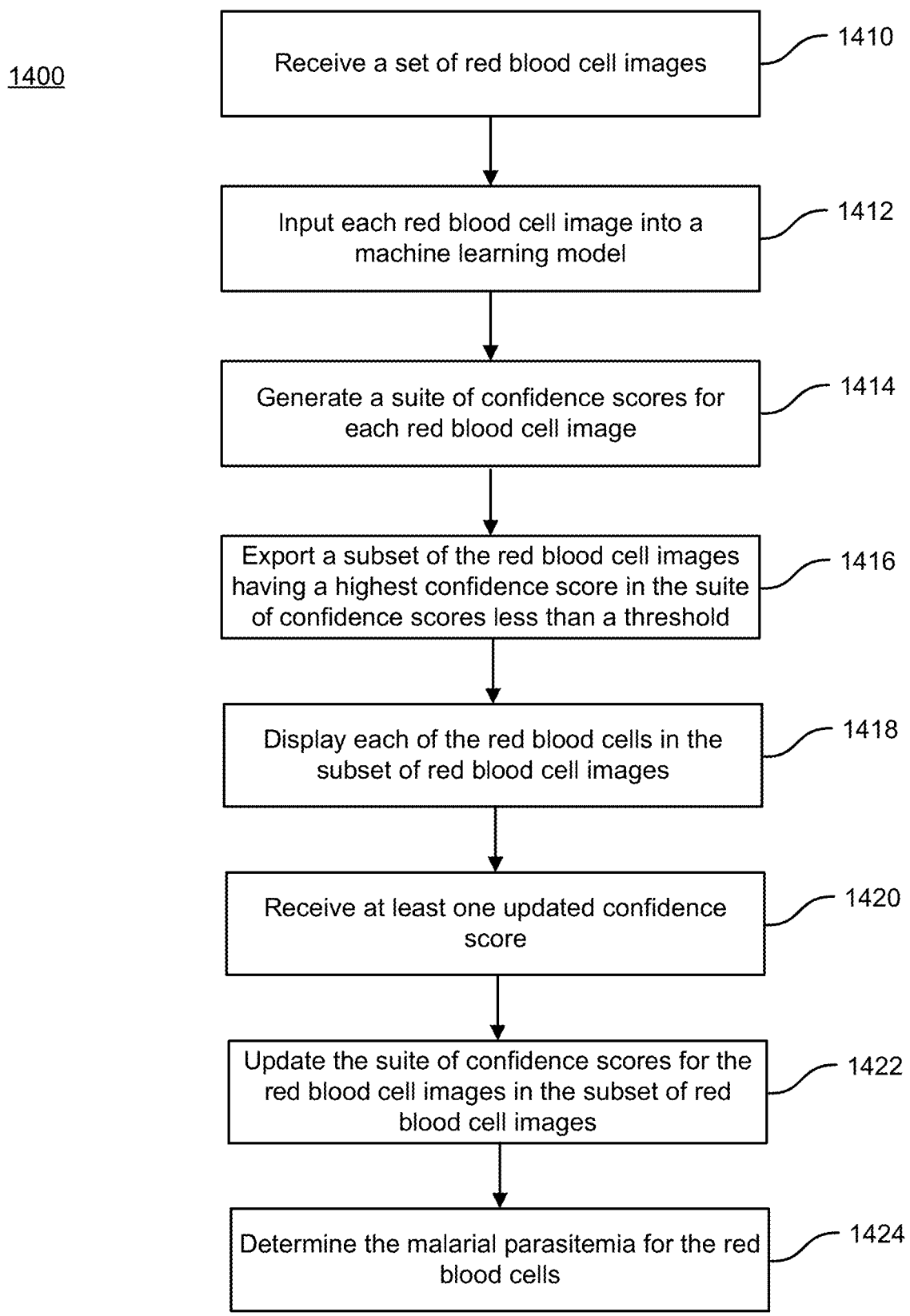
FIG. 14 is a simplified flowchart illustrating a method of measuring malaria parasitemia using updated confidence scores according to an embodiment of the present invention.

FIG. 14 is a simplified flowchart illustrating a method of measuring malaria parasitemia using updated confidence scores according to an embodiment of the present invention. The method 1400 includes receiving a set of red blood cell images (1410). Each red blood cell image in the set of red blood cell images is associated with a particular red blood cell and can be acquired as discussed more fully herein. The set of red blood cell images can be captured or acquired by flowing the sample, which can be in liquid form and include live cells, through a flow cell. Thus, the sample may be mobile and be free of Giemsa staining.

For each red blood cell image in the set of red blood cell images, the method also includes inputting each red blood cell image into a machine learning model (1412) and generating, using the machine learning model, a suite of confidence scores (1414). Each of the confidence scores in the suite of confidence scores defines a probability that the particular red blood cell is associated with one of a plurality of malaria parasite lifecycle stages.

Accordingly, a first confidence score can be associated with a malaria-free red blood cell, a second confidence score can be associated with a ring-stage parasite, a third confidence score can be associated with a trophozoite-stage parasite, and a fourth confidence score can be associated with a schizont-stage parasite.

The method further includes exporting a subset of red blood cell images having a highest confidence score in the suite of confidence scores less than a threshold (1416). Thus, as discussed in relation to FIGS. 6A-6I, cells for which the highest confidence score in the suite is below a threshold are identified and exported for further processing. In an embodiment, the method includes displaying each of the subset of red blood cell images (1418), receiving at least one updated confidence score (1420), and updating the suite of confidence scores for each of the subset of red blood cells images using the at least one updated confidence score (1422). As an example, if a particular cell has a suite of confidence scores for which the highest confidence score in the suite is less than a threshold, a technician or other entity can examine the red blood cell image and identify the red blood cell as being healthy or having a parasite in a given stage. The confidence score associated with the given stage can then be set to one and the other confidence scores in the suite of confidence scores set to zero. As will be evident to one of skill in the art, setting the confidence score to one can be considered as equivalent to updating the label associated with the red blood cell, i.e., healthy or having a parasite in a given stage. In addition to updating the confidence score associated with the red blood cell image, the method can include removing the red blood cell image from the subset of red blood cell images, for example, when the red blood cell is misshapen, the image quality is poor because of overlapping cells, debris, motion blur, or the like.

Accordingly, the suite of confidence scores (and/or the label) for this cell is updated. In other embodiments, as discussed above, after the subset of the red blood cell images is exported, they can have their suites of confidence scores updated or the red blood cells can be reclassified as appropriate to the particular application. Moreover, the method includes determining the malarial parasitemia for the particular red blood cells using the suites of confidence scores that have been updated along with the original suites of confidences scores for cells that did not have their red blood cell images exported.

It should be appreciated that the specific steps illustrated in FIG. 14 provide a particular method of measuring malaria parasitemia using updated confidence scores according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15:
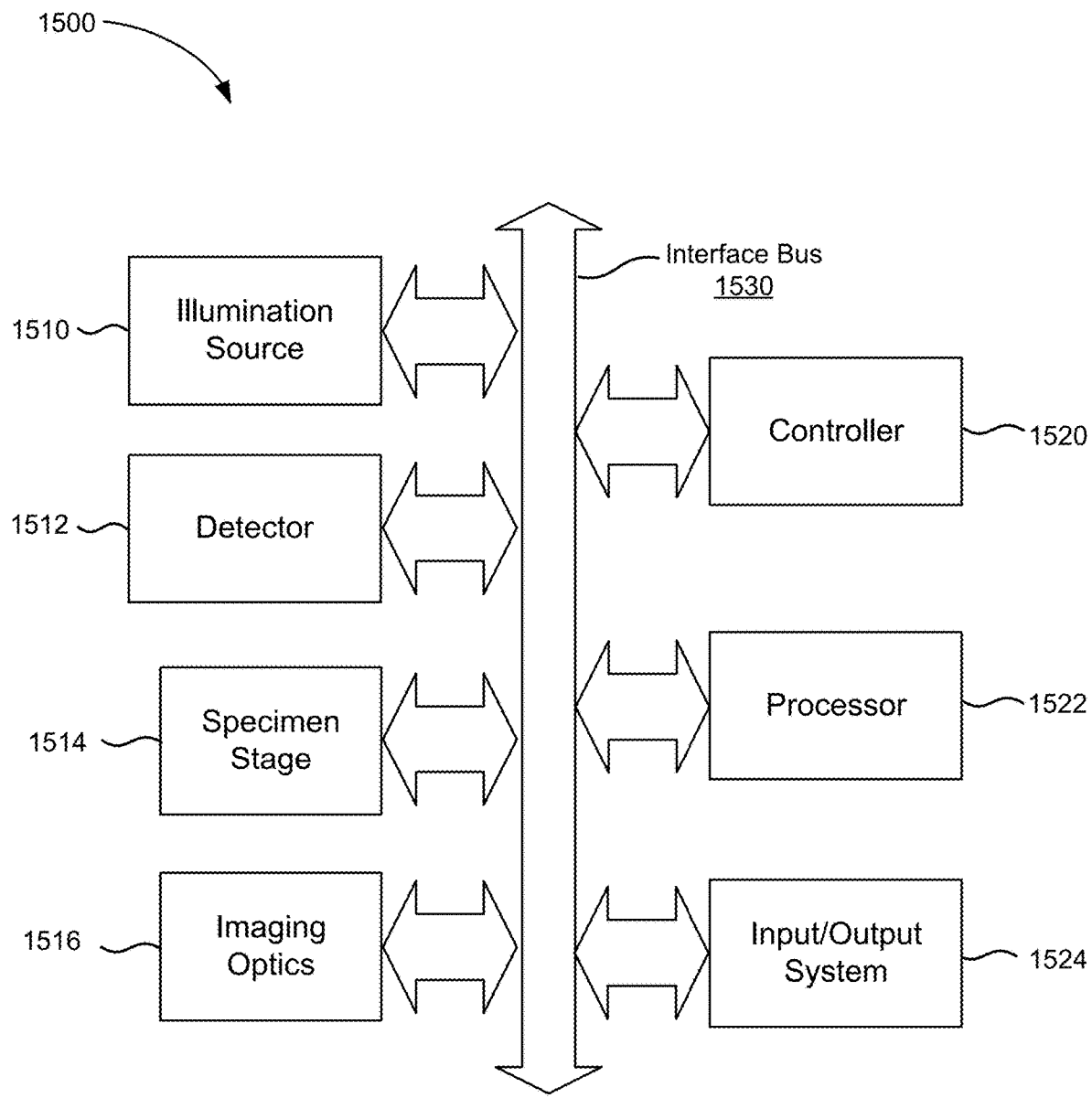
FIG. 15 is a simplified schematic diagram illustrating a microscope-based malaria parasite detection and classification system according to an embodiment of the present invention.

FIG. 15 is a simplified schematic diagram illustrating a microscope-based malaria parasite detection and classification system according to an embodiment of the present invention. The microscope-based malaria parasite detection and classification system 1500 includes an illumination source 1510, which can include one or more laser or LED sources operable to generate illumination light at one or more predetermined wavelengths. As an example, a 405 nm LED can be utilized. In some embodiments, multiple illumination sources are utilized as illustrated in FIG. 1. Thus, illumination light provided by illumination source 1510 can be generated at a plurality of illumination wavelengths, for example, over predetermined wavelength bands or at predetermined wavelengths. Illumination optics are utilized to direct the illumination light to the sample.

Microscope-based malaria parasite detection and classification system 1500 also includes detector 1512 and specimen stage 1514. In some embodiments, specimen stage 1514 is implemented as a flow cell that supports flow of a liquid sample, including live cells, during imaging. Imaging optics 1516 can be implemented as an objective that collects and focuses light on detector 1512.

Microscope-based malaria parasite detection and classification system 1500 further includes controller 1520, processor 1522, and an input/output system 1524. Controller 1520, which can be a computer controller, is utilized to operate the various system elements, for example, controlling stroboscopic illumination emitted by illumination source 1510, controlling the flow of the sample through the sample stage 1514, e.g., a flow cell, and detection of images using detector 1512. The captured images are provided to processor 1522, which may be a computer processor coupled to input/output system 1524. The various elements of microscope-based malaria parasite detection and classification system 1500 are connected via interface bus 1530, which provides for control and data signals to be transmitted to/from and received to/from one or more of the various elements.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of measuring malarial parasitemia, the method comprising:
    disposing a sample including a plurality of red blood cells in liquid form on a sample stage;
    illuminating the sample with optical radiation;
    capturing, at a first focal plane, first image of the plurality of red blood cells in the sample;
    extracting, from the first image, a first red blood cell image associated with a particular red blood cell;
    capturing, at a second focal plane, a second image of the plurality of red blood cells in the sample;
    extracting, from the second image, a second red blood cell image associated with the particular red blood cell;
    computing a first focus metric for the first image;
    computing a second focus metric for the second image;
    forming an input set by selecting the first image if the first focus metric is greater than the second focus metric or the second image if the second focus metric is greater than the first focus metric;
        inputting the input set into a machine learning model; and
        generating, using the machine learning model, a classification related to a malaria parasite lifecycle stage for the particular red blood cell; and
    determining the malarial parasitemia for the sample.

2. The method of claim 1 wherein the classification related to the malaria parasite lifecycle stage comprises a suite of confidence scores, wherein each of the confidence scores in the suite of confidence scores defines a probability that the particular red blood cell is associated with one of a plurality of malaria parasite lifecycle stages.

3. The method of claim 2 wherein the suite of confidence scores comprises:
    a first confidence score associated with a ring-stage parasite;
    a second confidence score associated with a trophozoite-stage parasite; and
    a third confidence score associated with a schizont-stage parasite.

4. The method of claim 2 wherein the suite of confidence scores comprises:
    a first confidence score associated with a malaria-free red blood cell;
    a second confidence score associated with a ring-stage parasite;
    a third confidence score associated with a trophozoite-stage parasite; and
    a fourth confidence score associated with a schizont-stage parasite.

5. The method of claim 4 further comprising summing:
    a number of cells for which the third confidence score is the highest confidence score in the suite of confidence scores; and
    a number of cells for which the fourth confidence score is the highest confidence score in the suite of confidence scores; wherein
    the malarial parasitemia is a late-stage parasitemia.

6. The method of claim 4 wherein the malarial parasitemia is an overall parasitemia computed by:
    determining a number of cells that are parasitemic as a sum of cells for which the second confidence score, the third confidence score, or the fourth confidence score is the highest confidence score in the suite of confidence scores for the cell; and
    dividing the number of cells that are parasitemic by a total number of cells.

7. The method of claim 1 wherein the sample stage comprises a flow cell.

8. The method of claim 1 wherein the sample comprises live cells.

9. The method of claim 1 further comprising, prior to extracting the first red blood cell image, performing semantic segmentation on the first image.

10. The method of claim 1 wherein extracting the first red blood cell image and the second red blood cell image comprises determining a bounding box associated with each red blood cell image.

11. The method of claim 1 wherein the malarial parasitemia is categorized as an early stage parasitemia associated with a ring-stage parasite or a late-stage parasitemia associated with a trophozoite-stage or a schizont-stage parasite.

12. The method of claim 1 wherein the optical radiation comprises light in the ultraviolet light wavelength range.

13. The method of claim 1 wherein the optical radiation comprises light having a wavelength between 350 nm and 420 nm.

14. The method of claim 13 wherein the wavelength is 365 nm.

15. The method of claim 13 wherein the wavelength is 405 nm.

16. The method of claim 1 wherein the sample comprises purified red blood cells immersed in liquid.

17. The method of claim 1 wherein the sample comprises whole blood.

18. The method of claim 1 wherein the sample is free of Giemsa staining.

19. The method of claim 1 wherein the first red blood cell image and the second red blood cell image are each associated with a different wavelength.

* * * * *